United States Patent [19]
Kushima et al.

[11] Patent Number: 5,201,506
[45] Date of Patent: Apr. 13, 1993

[54] SHEET FILM LOADING APPARATUS

[75] Inventors: Hiroshi Kushima; Mikio Tsuyuki, both of Minami-ashigara, Japan

[73] Assignee: Fuji Photo Film Co., Ltd., Kanagawa, Japan

[21] Appl. No.: 773,004

[22] Filed: Oct. 8, 1991

Related U.S. Application Data

[63] Continuation-in-part of Ser. No. 478,399, Feb. 12, 1990, Pat. No. 5,080,343.

[30] Foreign Application Priority Data

Feb. 14, 1989 [JP] Japan ................................. 1-34153
Mar. 3, 1989 [JP] Japan ............................. 1-24677[U]

[51] Int. Cl.$^5$ ............................................. B65H 3/08
[52] U.S. Cl. .......................................... 271/5; 271/9; 271/11
[58] Field of Search ...................... 271/5, 9, 11–13; 414/280, 331, 411, 416

[56] References Cited

U.S. PATENT DOCUMENTS 4,878,799 11/1989 Seto ..................................... 414/331
5,044,621 9/1991 Sachs .................................... 271/11

FOREIGN PATENT DOCUMENTS 59-184143 12/1984 Japan .
63-223741 9/1988 Japan .
8806749 9/1988 PCT Int'l Appl. .

Primary Examiner—Richard A. Schacher
Attorney, Agent, or Firm—Sughrue, Mion, Zinn, Macpeak & Seas

[57] ABSTRACT

A loading apparatus for selectively taking out a sheet film from among sheet films accommodated in a plurality of magazines and loading the sheet film into a cassette. The sheet taken out from the magazine is adapted to be held in a holding device in a curved state. In a holding section, the sheet film is received from a lower end thereof and is taken out from an upper end thereof so as to be loaded into the cassette. Hence, even if there are a multiplicity of magazines, the film can be fetched speedily and loaded into the cassette, and the apparatus can be made compact. The magazine is drawn out from the apparatus body in a cantilevered manner so as to load the films, thereby facilitating the loading operation.

11 Claims, 13 Drawing Sheets

SHEET FILM LOADING APPARATUS

This is a continuation-in-part application of patent application Ser. No. 07/478,399 filed on Feb. 12, 1990 now U.S. Pat. No. 5,080,343.

BACKGROUND OF THE INVENTION

1. Field of the Invention

The present invention relates to a sheet film loading apparatus for taking out a sheet film from a magazine and loading the same into a cassette.

2. Statement of the Related Art

As an apparatus for loading an X-ray film into a photographing cassette, an apparatus has been proposed in which a sheet film is taken out by a sucking means and is loaded into a cassette (Japanese Patent Laid-Open No. 249833/1987). The arrangement of this apparatus is such that X-ray sheet films are classified by type and the classified X-ray sheet films are respectively accommodated in a plurality of magazines. The sucking means is adapted to such an end portion of a film accommodated in a selected magazine to take out the film. The film thus taken out is fed between a pair of feed rollers disposed at an entrance portion of the cassette so as to be clamped thereby. For this reason, the sucking means serves as both a film removing means and a film conveying means. However, a tail portion of the film is liable to be brought into contact with other parts located in the vicinity thereof until the film which has been taken out from the magazine by the sucking means is carried into the cassette, thereby imparting damage to the film.

In addition, another apparatus has been proposed in which after the sheet film inside the magazine is taken out by the sucking means, the sheet film is accommodated in a holding frame in an arcuate form. This holding frame is transferred to a position corresponding to a cassette so as to load a sheet film into the cassette (International Publication No. WO 06749/1988). With this apparatus, when the sheet film is taken out from the magazine and transferred to the cassette so that the sheet film is accommodated in the holding frame, the film is prevented from being damaged due to contact with other parts during the transfer. However, since a driving force for accommodating the sheet film into the holding frame and a driving force for sending the sheet film from the holding frame to the cassette are both effected by the sucking means, it is necessary for the sucking means to such an end of the sheet film and, at the same time, insert the sheet film from one end of the holding frame and also take the sheet film out from one end of the holding frame at the time of sending it to the cassette. For this reason, in cases where a plurality of magazines are disposed in a vertical row, it is necessary for one end of the holding frame to be vertically movable in correspondence with all the magazines, resulting in an increased height of the overall apparatus.

The film supplying magazines that are mounted on such a film loading apparatus are generally films are accommodated in the magazines in a dark room. On the other hand, in the case of magazines that allow the films covered in a special package to be accommodated in a lighted room, the magazine is first removed from the film loading apparatus, the cover is then opened, and the sheet films are accommodated in the magazine (refer to Japanese Utility Model Laid-Open No. 184143/1984).

However, this type of magazine is generally very heavy due to a plurality of guide rollers and parts for shielding the interior from light are disposed inside. Accordingly, the operation of removing and reinstalling the magazine from and onto the film loading apparatus involves hard physical labor. In addition, the magazine is provided with a light shielding plate projecting from its intermediate portion so as to close an installation opening provided in the film loading apparatus when the magazine is reinstalled onto the film loading apparatus. As a result, when the magazine is placed on a work table, the magazine cannot be placed in a horizontal position. Therefor, any operation is carried out in an unstable condition.

In contrast, an arrangement has been proposed in which a sheet film carrier, capable of being drawn out at the time of accommodating the sheet films is provided in a film loading apparatus. (refer to Japanese Patent Laid-Open No. 223741/1988). With this loading apparatus, since the sheet films can be accommodated without removing the heavy carrier from the film loading apparatus, hard physical labor can be alleviated.

This proposed loading apparatus, however, has a drawback in that since the sheet films need to be accommodated directly in the carrier, the sheet films can be accommodated only in a state in which they are covered with a special package that permits the films to be accommodated in a lighted room. In addition, since a plurality of carriers are unable only for films of specific sizes, the number of the types of films that can be used among a multiplicity of film sizes is restricted to the number of the carriers provided.

SUMMARY OF THE INVENTION

Accordingly, an object of the present invention is to provide a sheet film loading apparatus which makes it unnecessary to increase the overall height of the apparatus in cases where a multiplicity of magazines are disposed in a vertical row and without damaging the film during transfer of the film from the magazine to the cassette.

Another object of the present invention is to provide a sheet film loading apparatus which facilitates a film accommodating operation and is adaptable to different film sizes.

In accordance with the present invention, there is provided a sheet film loading apparatus for selectively taking out a sheet film from a plurality of magazines and loading the sheet film into a cassette, having: taking-out device for taking out a sheet film from one of the magazines; holding, device which is movable separately from the taking-out device and is adapted to receive via one end of the holding device the sheet film supplied from the taking-out device, hold the sheet film in a state in which at least part of the sheet film is curved, and supply the sheet film from the other end of the holding device into the cassette; and driving device which is adapted to make the taking-out device and the holding device correspond to one of the magazines and space the holding device from the taking-out device so as to cause the holding device to correspond to the cassette.

In accordance with the present invention, one end of the holding device is made to correspond to one of the plurality of magazines, and the sheet film taken out from the magazine by the taking-out means is inserted into this one end. Inside the holding device, the sheet film is bent with at least part thereof curved, and the tip portion of the sheet film inserted corresponds to the other end of the holding device. Consequently, when the sheet film held by the holding device is loaded into the cassette, the holding device makes the other end of the holding device to correspond to an entrance portion of the cassette. Hence, in cases where the multiplicity of magazines are arranged in a vertical row, if one end of the holding device, which is an entrance portion for the sheet film, is disposed in a lower portion of the holding device and the other end, which is an exit portion, is disposed in an upper portion of the holding device, it suffices if only one end disposed in the lower portion be made capable of corresponding to each magazine and the other end disposed in the upper portion be made to correspond to the cassette. Therefore, even when the holding device is made to correspond to a lowermost magazine, the holding device does not project substantially downward from the apparatus, and the overall height of the apparatus is not made large.

In addition, in cases where the taking-out device and the holding device are separately movable and are made to correspond to each magazine, and the sheet films are taken out consecutively from the same magazine, it suffices to move only the holding device between the cassette and the magazine. Hence, the taking-out device can be set in a stationary position corresponding to the magazine, so that a speedy operation of taking out and loading the sheet film becomes possible.

BRIEF DESCRIPTION OF THE DRAWINGS

FIGS. 5 to 12 are diagrams relating to a film loading apparatus in accordance with a third embodiment of the present invention, in which FIG. 5 is a vertical cross-sectional view of the film loading apparatus;

FIG. 6 is a perspective view of the film loading apparatus;

FIG. 7 is a perspective view illustrating a magazine and a tray;

FIG. 8 is an exploded perspective view illustrating the magazine and the tray;

FIG. 9 is a cross-sectional view of the film supplying magazine taken along the line IX—IX of FIG. 8;

FIG. 10 is a top plan view illustrating a state in which a cover shown in FIG. 9 is open;

FIG. 11 is an exploded perspective view illustrating a structure for supporting a squeeze roller;

FIG. 12 is a partly cutaway perspective view of a film package, illustrating a state of correspondence between the package and the film.

DESCRIPTION OF THE PREFERRED EMBODIMENTS

Figure 1:
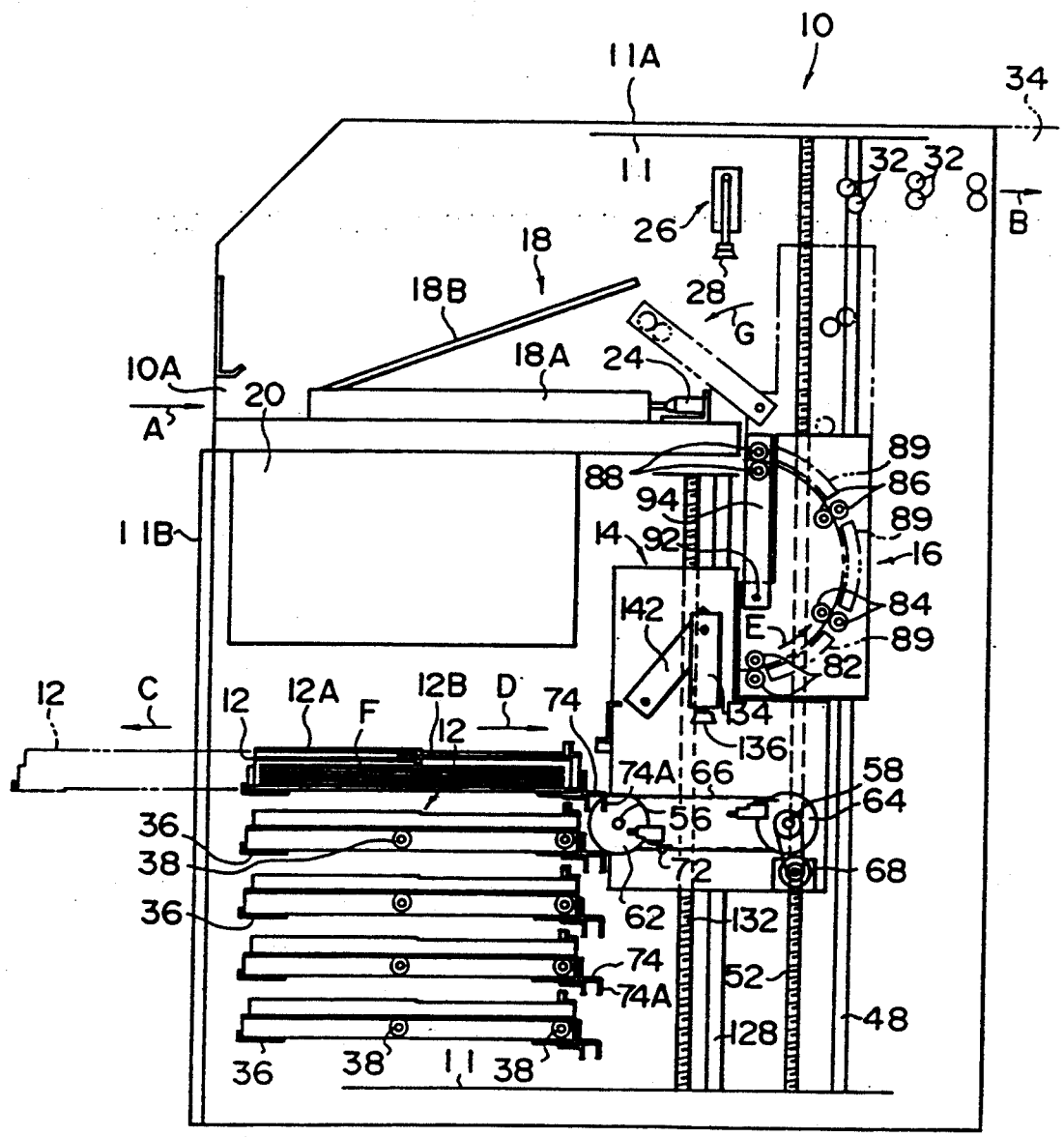
FIG. 1 is a vertical cross-sectional view of a sheet film loading apparatus in accordance with a first embodiment of the present invention.

FIG. 1 illustrates a sheet film loading apparatus 10 in accordance with a first embodiment of the present invention.

The sheet film loading apparatus 10 has a frame 11 which, together with an outer plate 11A secured thereto, constitutes a loading apparatus body. The sheet film loading apparatus 10 has a structure in which its interior is shielded from light. A plurality of magazines 12 are disposed in a lower portion of the frame 11. Sheet films F are accommodated respectively in the magazines 12. The sheet films F accommodated in the respective magazines 12 are of mutually different types (in terms of the size and the film type). The desired sheet films F are loaded into a cassette 18 by means of a taking-out means 14 and a holding means 16.

However, films of different types may not need to be accommodated in the respective magazines 12. Films of an identical type may be accommodated in a plurality of magazines if, for instance, there is a certain types of film that are used frequently.

The arrangement of the sheet film loading apparatus 10 is such that when the cassette 18 is manually loaded (in the direction of arrow A) into the sheet film loading apparatus 10 through a loading port 10A (normally shielded) provided in an upper portion of the sheet film loading apparatus 10, the cassette 18 is drawn in by a driving force of a cassette driving mechanism 20 and is thereby disposed in the position illustrated in FIG. 1.

Figure 3:
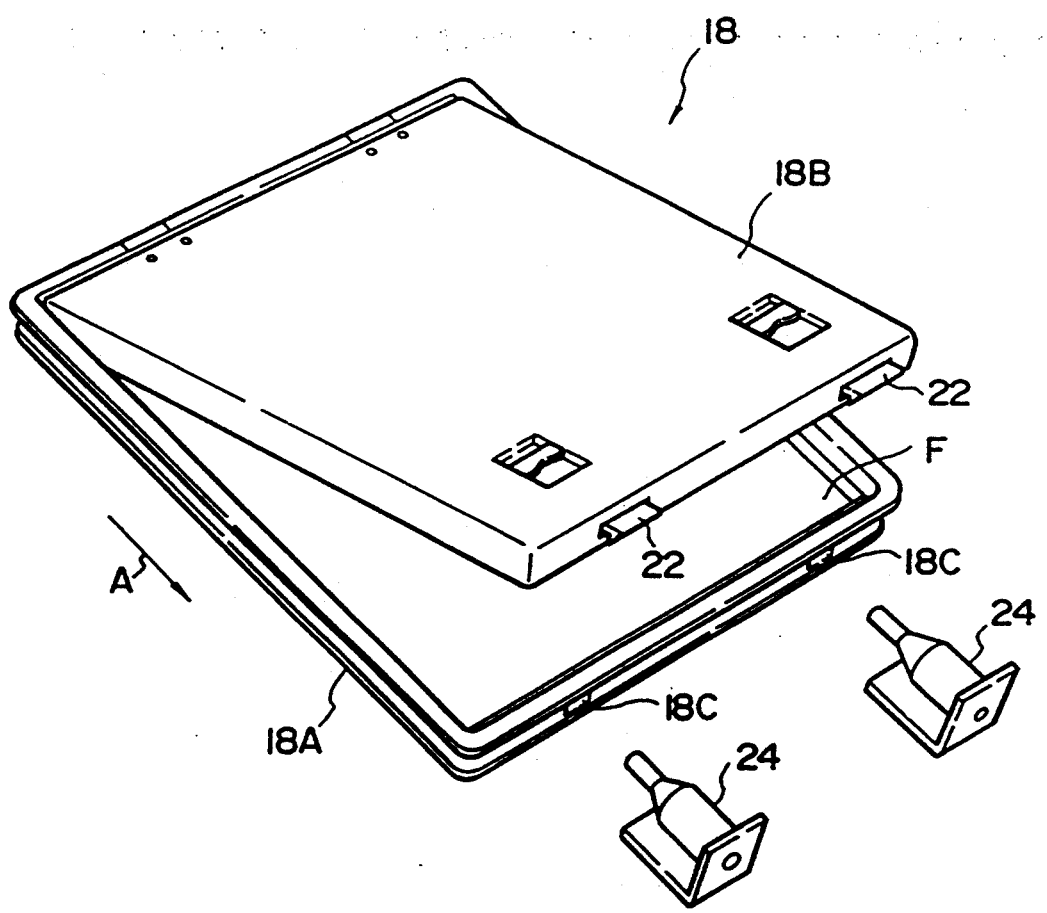
FIG. 3 is a perspective view of a state in which a cover is open, illustrating the relationship of correspondence between a cassette and cover-opening pins which are a mechanism for opening the cover.

As for cassette 18, shown in FIG. 3, the interior of a tray-shaped cassette body 18A serves as an accommodating portion for the sheet film F. A cover plate 18B is pivotally supported at one end of the cassette body 18A so as to be opened and closed. At the other end portion of the cover plate 18B a pair of claws 22 project and are adapted to engage with a pair of windows 18C formed in portions of the cassette body 18A so as to maintain a state of the cassette 18A. As shown in FIG. 3, as the cassette driving mechanism 20 presses the cassette 18 against a pair of cover-opening pins 24, the cover-opening pins 24 cause the claws 22 to be pressed into the cassette body 18A, and the cover plate 18B to be opened by means of an urging force of an unillustrated resilient member.

In addition, as shown in FIG. 1, a taking-out means 26 is disposed in the vicinity of a film inlet/outlet port of the loaded cassette 18. Upon receiving a driving force from an unillustrated driving source a suction device 28 removes a photographed sheet film F accommodated in the cassette body 18A and delivers it to conveying rollers 32. Upon receiving a driving force from an unillustrated driving source, these conveying rollers 32 convey the photographed sheet film F to a developing device 34 (in the direction of arrow B).

It should be noted that the following arrangement may be provided: When the cassette 18 is loaded into the sheet film loading apparatus 10, and the cover plate 18B is opened by the cover-opening pins 24, the cover plate 18B is opened further by an unillustrated cover opening/closing mechanism (e.g., a means disclosed in Japanese Utility Model Laid-Open Nos. 141950/1988 and 141951/1988). Subsequently, when a new sheet film F is loaded after the photographed sheet film F has been removed, the cover plate 18B is closed, and the cassette 18 is pushed out through the loading port 10A.

Figure 2:
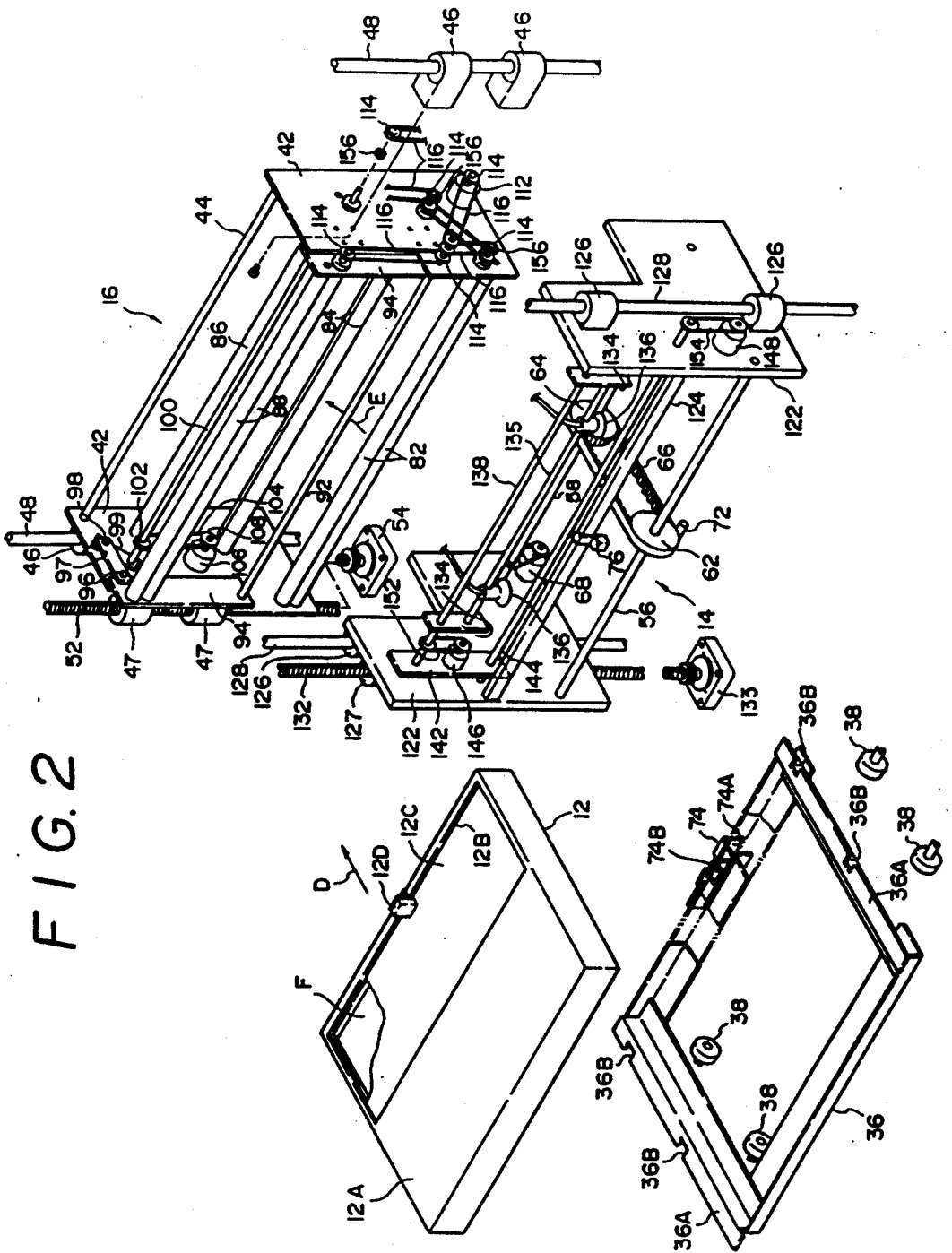
FIG. 2 is an exploded perspective view illustrating an essential portion of the first embodiment.

As also shown in FIG. 2, the magazine 12 is formed in a configuration of a deep tray. A multiplicity of unexposed sheet films F are accommodated therein in a stacked state. An upper end surface of the magazine 12 constitutes a fixed cover plate 12A for closing its half portion which is opposite from the side close to the taking-out means 14, and its remaining half portion constitutes a takeout opening 12B. A slide cover 12C corresponds to the takeout opening 12B. The arrangement of the slide cover 12C is such that, as shown in FIG. 2, the slide cover 12C is movable from a position in which it positively closes the takeout opening 12B to a position in which it opens the takeout opening 12B after sliding and entering into a space below the cover plate 12A.

Magazines 12 are respectively accommodated, in a multiplicity of stages, on movable carriages 36 disposed within the frame 11 of the sheet film loading apparatus 10. Each of the movable carriages 36 is formed into a configuration of a frame for supporting peripheral bottom portions of the magazine 12, and each has a pair of bent portions 36A projecting horizontally from upper ends of both sides thereof. These bent portions 36A are placed on rollers 38 whose axes are pivotally supported by the frame 11 horizontally. The standby position of the movable carriage 36 is one in which it is set in the state shown by the solid line in FIG. 1 with the magazine 12 loaded thereon. The position of the movable carriage 36 for replenishing the sheet films F is one in which the movable carriage 36 is drawn out (in the direction of arrow C) after opening a door 11B of the frame 11 as viewed in FIG. 1. Fruthermore, the film taking-out position is when the magazine 12 has been moved in a rightward direction as viewed in FIG. 1 (in the direction of arrow D) from the standby position and the takeout opening 12B has reached below the taking-out means 14. In order to stop the magazine 12 in a predetermined position with the sheet films F in a standby state, the bent portions 36A are provided with notches 36B. The arrangement is such that when the notches 36B correspond to the rollers 38, the movement of the movable carriage 36 is stopped.

As shown in FIG. 2, the taking-out means 14 is provided with a pair of lifting frames 122 disposed parallel to each other. These lifting frames 122 are secured in parallel to each other by means of a plurality of connecting rods 124. A guide shaft 128 is passed through a pair of guide blocks 126 fixed to an outer side of each lifting frame 122. In addition, a pair of similar guide blocks 127 are also fixed to the outer side of one lifting frame 122 and are threadingly engaged with a screw shaft 132. These guide shafts 128 and the screw shaft 132 have vertical axes. The upper and lower ends of the guide shafts 128 are secured to the frame 11. The screw shaft 132 is pivotally supported by the frame 11 and is adapted to rotate by receiving a driving force from a motor 133. Accordingly, when the screw shaft 132 rotates upon receiving the driving force of the motor 133, the taking-out means 14 is capable of moving upward or downward so as to cope with each of the magazines 12.

Disposed between the lifting frames 122 are pair of suction devices 136 that are secured to a shaft 135 extending between arms 134. These arms 134 are pivotally supported by distal ends of a pair of arms 142 by means of a shaft 138. The arms 142 are respectively pivotally supported by the lifting frames 122 by means of a shaft 144. In addition, motors 146, 148 for controlling the angles of rotation of the arms 134, 142 are respectively provided on the arms 142 and the lifting frames 122. Their rotating forces are transmitted to the arms 134, 142 by means of endless belts 152, 154.

As a result, as the arms 134, 142 rotate, the suction devices 136 move substantially vertically downward from their positions shown in FIG. 1, suck the sheet film F accommodated in the magazine 12 which is in the film taking-up position and then raise and move in a rightward direction so as to send the tip portion of the sucked sheet film F to the holding means 16.

A pair of pulleys 62, 64 are respectively and pivotally supported at lower portions of the lifting frames 122 by means of support shafts 56, 58. An endless timing belt 66 is wound around and stretched between these pulleys 62, 64. The support shaft 58 is adapted to rotate by receiving a driving force from a motor 68 secured to the lifting frame 122. A pullout pin 72 is secured to a part of the endless timing belt 66, and its axis is parallel to the axes of the pulleys 62, 64 and corresponds to an engaging arm 74 secured to a front end of the movable carriage 36. This engaging arm 74 has a pullout pin-receiving portion 74A which is open downwardly in a U-shaped configuration. When the endless timing belt 66 rotates clockwise as viewed in FIG. 1, the pullout pin 72 is accommodated in the pullout pin-receiving portion 74A. As a result, the movable carriage 36, together with the magazine 12, is pulled out to below the taking-out means 14 in the direction of arrow D so as to assume the film taking-out position. The engaging arm 74 is provided with a notch 74B for avoiding interference with the endless timing belt 66.

The movable carriage 36 is pulled out to the film taking-out position as the pulleys 62, 64 rotate. During the course of the movement of the movable carriage 36 an arm 12D projecting upward from the slide cover 12C of the magazine 12 is brought into contact with a magnetic attracting piece 76 provided on the connecting rod 124 of the lifting frame 122, thereby hindering the movement of the slide cover 12C. As a result, the magazine and the slide cover 12C which move together with the movable carriage 36 move relative to each other, so that the takeout opening 12B is opened. In addition, when the movable carriage 36 and the magazine 12 are returned to the standby position by the reverse rotation of the pulleys 62, 64, since the attracting piece 76 prevents the movement of the slide cover 12C by means of its magnetic force, the slide cover 12C moves relative to the magazine 12, so that the takeout opening 12B is closed.

The holding means 16 comprises a pair of lifting frames 42 that are secured in parallel to each other by means of a plurality of connecting rods 44, as shown in FIG. 2. The sheet film F is held between these lifting frames 42.

A guide shaft 48, whose axis is vertical and whose upper and lower ends are secured to the frame 11, is passed through a pair of guide blocks 46 fixed to an outer side of each lifting frame 42. A screw shaft 52 is threadingly engaged with a pair of similar guide blocks 47, and this screw shaft 52 is disposed parallel with the guide shaft 48. For this reason, when the screw shaft 52 rotates by receiving a driving force of a motor 54, the lifting frame 42 moves vertically up to a predetermined position so as to correspond to each magazine 12 and cassette 18.

A pair of upper and lower entrance clamp rollers 82 are rotatably supported by and extend between lower portions of the lifting frames 42 in parallel with each other. These entrance clamp rollers 82 are adapted to receive the sheet film F taken out from the magazine by the suction devices 136 and feed the same in the direction of arrow E so as to hold the sheet film F in a semi-circularly curved shape. Similar to the entrance clamp rollers 82, a pair of intermediate portion clamp rollers 84 and a pair of intermediate portion clamp rollers 86 are pivotally supported in correspondence with an intermediate portion of the sheet film F and thus held in the semispherical shape. Furthermore, a pair of exit clamp rollers 88 are provided to clamp a tip portion of the sheet film F held in the semicircular shape. For this reason, when a lengthy sheet film F is held, a rear-end portion of the sheet film F is clamped by the entrance clamp rollers 82, an intermediate portion thereof by the intermediate portion clamp rollers 84, 86, and the tip portion thereof by the exit clamp rollers 88. In addition, the arrangement is such that even in cases where the length of the sheet film F is short, the tip portion of the sheet film F can unfailingly be held by the exit clamp rollers 88.

These exit clamp rollers 88 are pivotally supported by tip portions of a pair of swingable frames 84 which in turn are pivotally supported by the lifting frames 42 by a shaft 92. A first swing link 97 is pivotally supported at a tip of each swingable frame 94 by means of a pin 96. The other end of the first swing link 97 is pivotally supported by a second swing link 99 by a pin 98. This second swing link 99 is pivotally supported by a rotating shaft 100 which is stretched between the lifting frames 42. A part of an endless belt 104 is wound around a pulley 102 that is secured to the rotating shaft 100. Another portion of the endless belt 104 is wound around a pulley 108 that is secured to an output shaft of a motor 106 which in turn is secured to the lifting frame 42.

Consequently, when the motor 106 rotates, the second swing link 99 rotates together with the rotating shaft 100, and the first swing link 97 receives this rotating force and swings the swingable frame 94 counterclockwise as viewed in FIG. 1 (in the direction of arrow G). As a result, the tip portion of the sheet film F moves to above the inlet/outlet portion of the cassette 18 with the tip portion clamped by the exit clamp rollers 88. This facilitates the insertion of the sheet film F into the cassette 18.

As shown in FIG. 2, a plurality of pulleys 114 and endless timing belts 116 are disposed on the outer side of the lifting frame 42 so as to transmit a drive force from a motor 112 to the entrance clamp rollers 82, intermediate portion clamp rollers 84, 86, and exit clamp rollers 88.

The operation of this embodiment will be described hereinunder.

When the cassette 18 with a photographed sheet film F accommodated therein is loaded into the sheet film loading apparatus 10 through the loading port 10A in the direction of arrow A, the cassette driving mechanism 20 presses the cassette 18 against the cover-opening pins 24, so that the cover plate 18B is opened as shown in FIGS. 1 and 3.

Subsequently, the suction device 28 of the taking-out means 26 sucks the sheet film F accommodated in the cassette body 18A and delivers the same to the conveying rollers 32. The photographed sheet film F is then sent to the developing device 34 so as to undergo development.

Next, a film type discrimination signal (not shown) issued by an unillustrated a film discriminator attached to the cassette 18 is detected by an unillustrated detecting means, and a sheet film F to be loaded into the thus selected is accommodated. This movement is effected as the screw shaft 52 guiding the lifting frames 42 and the screw shaft 132 guiding the lifting frames 122 respectively rotate by receiving driving forces from motors 54, 133, which in turn causes the lifting frames 42, 122 to move vertically.

When the taking-out means 14 and the holding means 16 move to the side of this specific magazine 12, the motor 68 rotates to cause the endless timing belt 66 to rotate clockwise as viewed in FIG. 1. As a result, the pullout pin 72 is engaged with the engaging arm 74 and moves the movable carriage 36 from the standby position of the magazine 12 to its film taking-out position. In conjunction with the movement of the magazine 12, the arm 12D of the slide cover 12C is brought into contact with the attracting piece 76, so that the slide cover 12C is moved to below the cover plate 12A, thereby opening the takeout opening 12B.

At this stage, as for the taking-out means, the motors 146, 148 rotate, and the suction devices 136 are pressed to an uppermost sheet film F accommodated in the magazine 12. Simultaneously, a negative pressure of an unillustrated negative pressure source is transmitted to the suction devices 136, with the result that a tip portion of the sheet film F is sucked. Subsequently, the suction devices 136 are raised with the rotation of the motors 146, 148 and are lifted up through the takeout opening 12B. The sheet film F is then inserted between the entrance clamp rollers 82. At this state, the motor 112 rotates and feeds the tip portion of the sheet film F in the direction of arrow E, and the supply of the negative pressure to the suction devices 136 is stopped. Consequently, the sheet film F passes consecutively between the entrance clamp rollers 82 and between the intermediate portion clamp rollers 84, 86. When the tip portion reaches the exit clamp rollers 88, the sheet film F is held by being curved in a semicircularly arcuate configuration with its tip clamped by the exit clamp rollers 88. In order to facilitate the smooth movement of the sheet film F between these rollers, it is preferable to provide guide plates 89 (shown by a two-dotted dash line in FIG. 1) between adjacent pairs of the rollers on the inner sides of the lifting frames 42.

When the sheet film F is accommodated inside the holding means 16, the suction devices 136 of the taking-out means 14 return to their original positions, and the motor 68 rotates reversely so that the movable carriage 36 returns the magazine 12 to the standby position.

At this stage, the holding means 16 is raised as the screw shaft 52 rotates. Then the exit clamp rollers 88 correspond to the entrance/exit port of the cassette 18, whereupon the lifting of the holding means 16 is stopped. As the motor 106 rotates, the swingable frames 94 rotate counterclockwise as viewed in FIG. 1 (in the direction of arrow G), so that the exit clamp rollers 88 approach the inlet portion of the cassette 18 after passing above the cover-opening pins 24. As a result, as the exit clamp rollers 88 rotate, the tip portion of the sheet film F is positively accommodated into the cassette 18. Since the swingable frames 94 cause the exit clamp rollers 88 to approach the inlet portion of the cassette 18, the sheet film F can be loaded positively from the holding means 16 into the cassette 18 even if the cover opening pins 24 for opening the cover plate 18B of the cassette 18 are in the state of being located forwardly of the cassette 18. The sheet film F can then be loaded positively from the holding means 16 into the cassette 18.

As for the sheet film F loaded in the cassette 18, since its front and back sides are inverted after passing through the holding means 16, so that the sheet film F when loaded in the cassette 18 is inverted from the state in which it is accommodated in the magazine 12. That is, since the sheet film F needs to be loaded into the cassette 18 with its emulsion surface facing the cover plate 18B, a film which is provided with an emulsion surface only on one side is accommodated in the magazine 12 with this emulsion surface facing downward. Accordingly, the suction devices 136 of the taking-out means 14 sucks the side of the sheet film F which is remote from the side where the emulsion surface is provided, so that the sucking force exerts no adverse effect on the photographic performance even if though the film is sensitive.

It is preferred that one-way clutches 156 are respectively provided between the entrance clamp rollers 82 and the intermediate portion clamp rollers 84, 86 on the one hand, and the pulleys of the timing belts 116 on the other so as to allow these rollers to rotate freely when high speed rotation in the sheet film-conveying direction is transmitted thereto. This arrangement is necessary in order to ensure that even when the swingable frames 94 rotate counterclockwise as viewed in FIG. 1 and cause the tip portion of the sheet film F to be brought into proximity to the cassette 18. The intermediate portion and rear end of the sheet film F will not be respectively clamped by the intermediate portion clamp rollers 84, 86 and the entrance clamp rollers 82, which can otherwise apply unnecessary tension to the sheet film F.

Upon completion of the loading of the sheet film F into the cassette 18, the swingable frames 94 return to their vertical positions, and the holding means 16 prepares itself for taking out an ensuing film. In this embodiment, however, since the taking-out means 14 is moved separately from the holding means 16, in cases where the ensuing sheet film F is taken out continuously from the same magazine 12, it is possible to keep the taking-out means stationary in correspondence with the magazine 12. This allows the ensuing operation of taking out the sheet film F to be effected speedily. In this case, the magazine 12 may be kept stationary as disposed in the film taking-out position.

In the holding means 16, since the sheet film F is received by the entrance clamp rollers 82 disposed in the vicinity of the lower ends of the holding means 16, even if the holding means 16 moves to the lowermost position at the time of taking out the sheet film F from the lowermost magazine 12, the holding means 16 does not project substantially to a level lower than the magazine 12. Accordingly, the overall height of the sheet film loading apparatus 10 does not become high.

Figure 4:
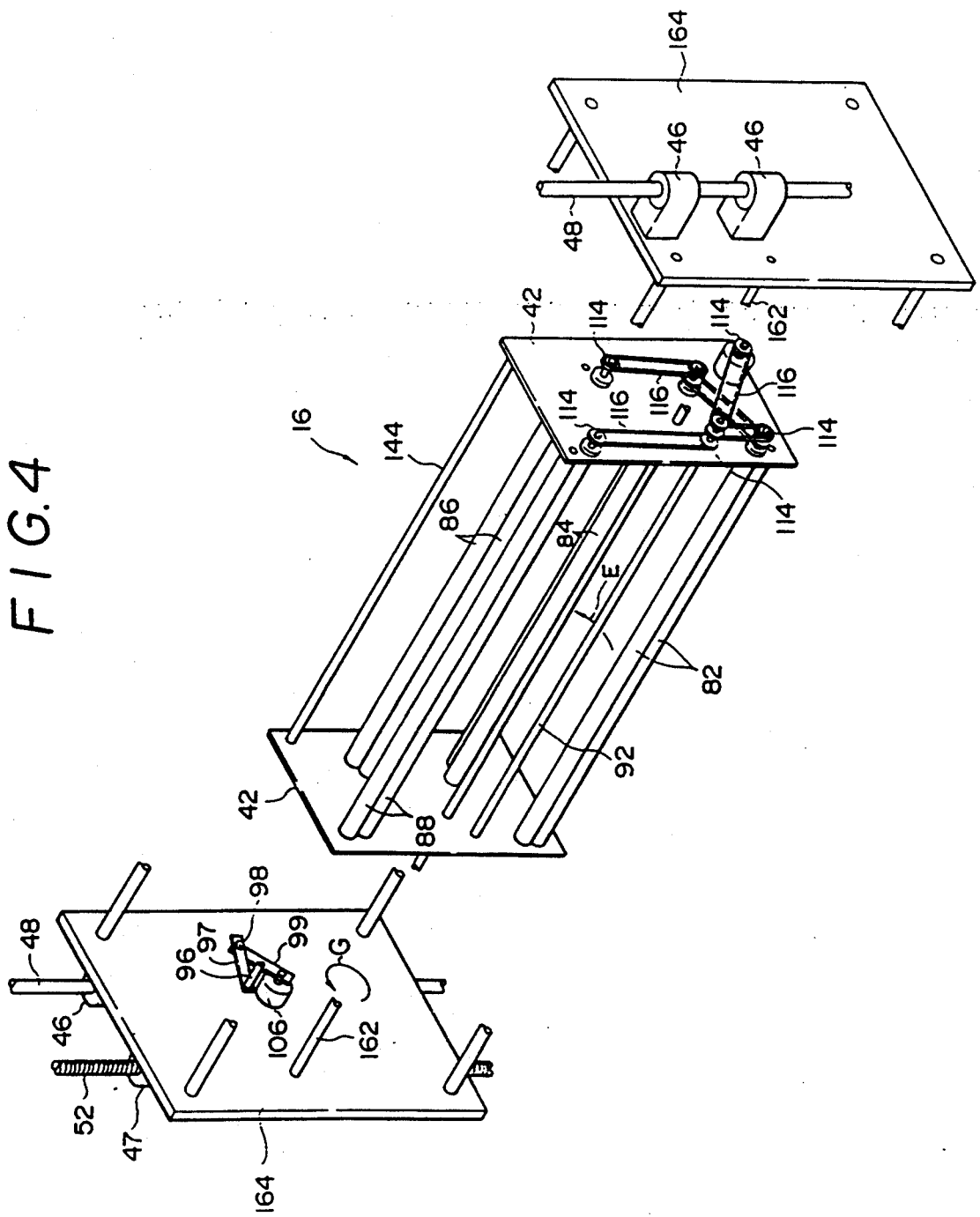
FIG. 4 is a perspective view illustrating a holding means in accordance with a second embodiment of the present invention.
Figure 5:
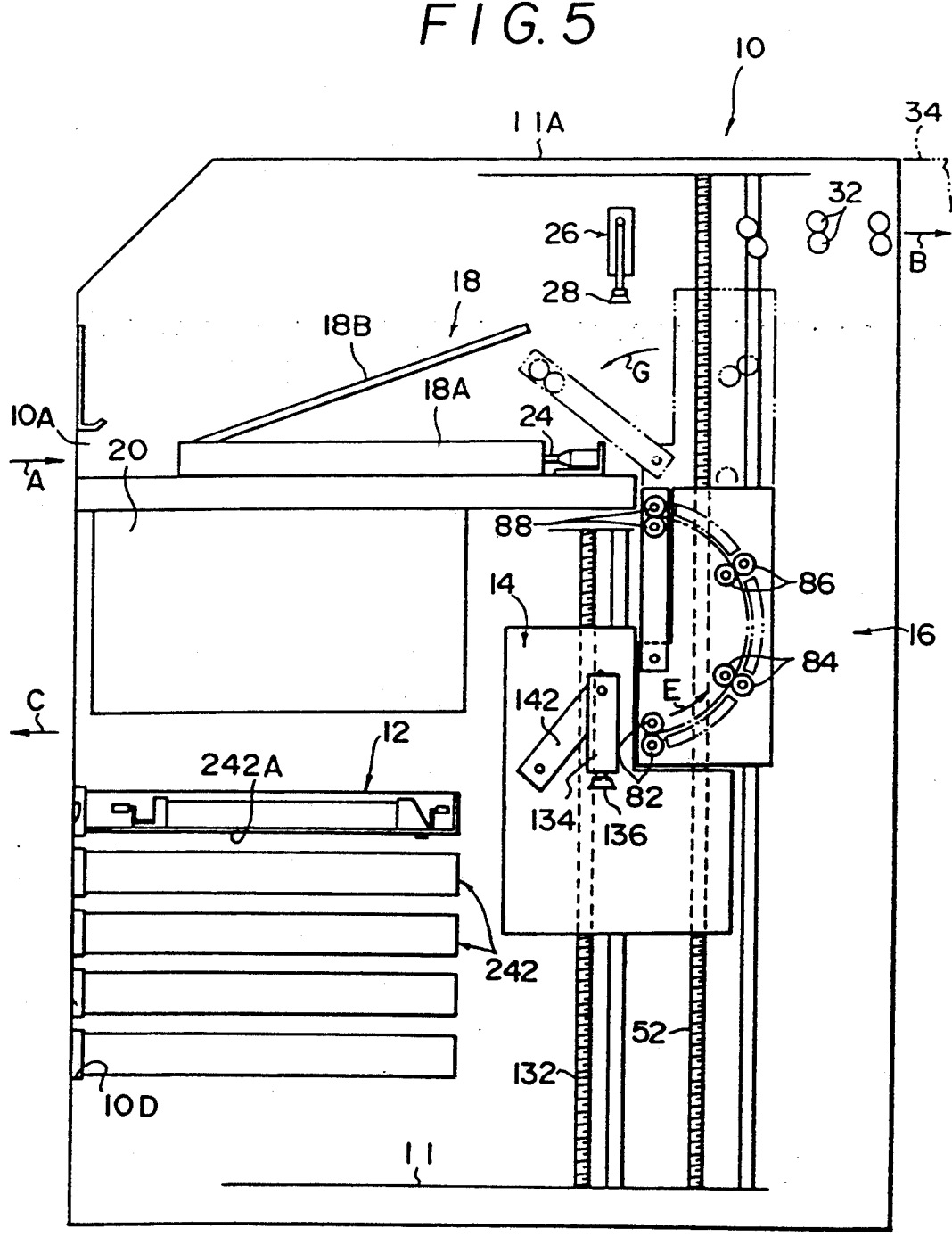

FIG. 4 illustrates a second embodiment of the present invention. In this embodiment, the swingable frames 94 used in the first embodiment are omitted, and the exit clamp rollers 88 are directly and pivotally supported by the lifting frames 42. Accordingly, the motor 106 and the like for driving the swingable frames 94 in the first embodiment are not provided. In addition, the holding means 16 is pivotally supported by a pair of outer brackets 164 by means of shafts 162. Guide blocks 46, 47 are secured to these outer brackets 164, and the holding means 16 is guided by the guide shafts 48 and the screw shaft 52 so as to move vertically.

The arrangement is such that the pin 96, first swing link 97, pin 98, second swing link 99, and motor 106 are disposed on an inner side of the outer bracket 164 so that the holding means 16 will rotate about the shaft 162 by means of the driving force from the motor 106. Hence, the tip portion of the sheet film F clamped by the exit clamp rollers 88 can be brought into proximity to the cassette 18 in the same way as the first embodiment. It should be noted that, in this embodiment, since the exit clamp rollers 88 as well as the intermediate portion clamp rollers 84, 86 and the entrance clamp rollers 82 are moved as a unit to rotate about the shaft 162, it is unnecessary to use the one-way clutches 156 employed in the first embodiment.

The other arrangements are identical with those of the first embodiment.

Figure 13:
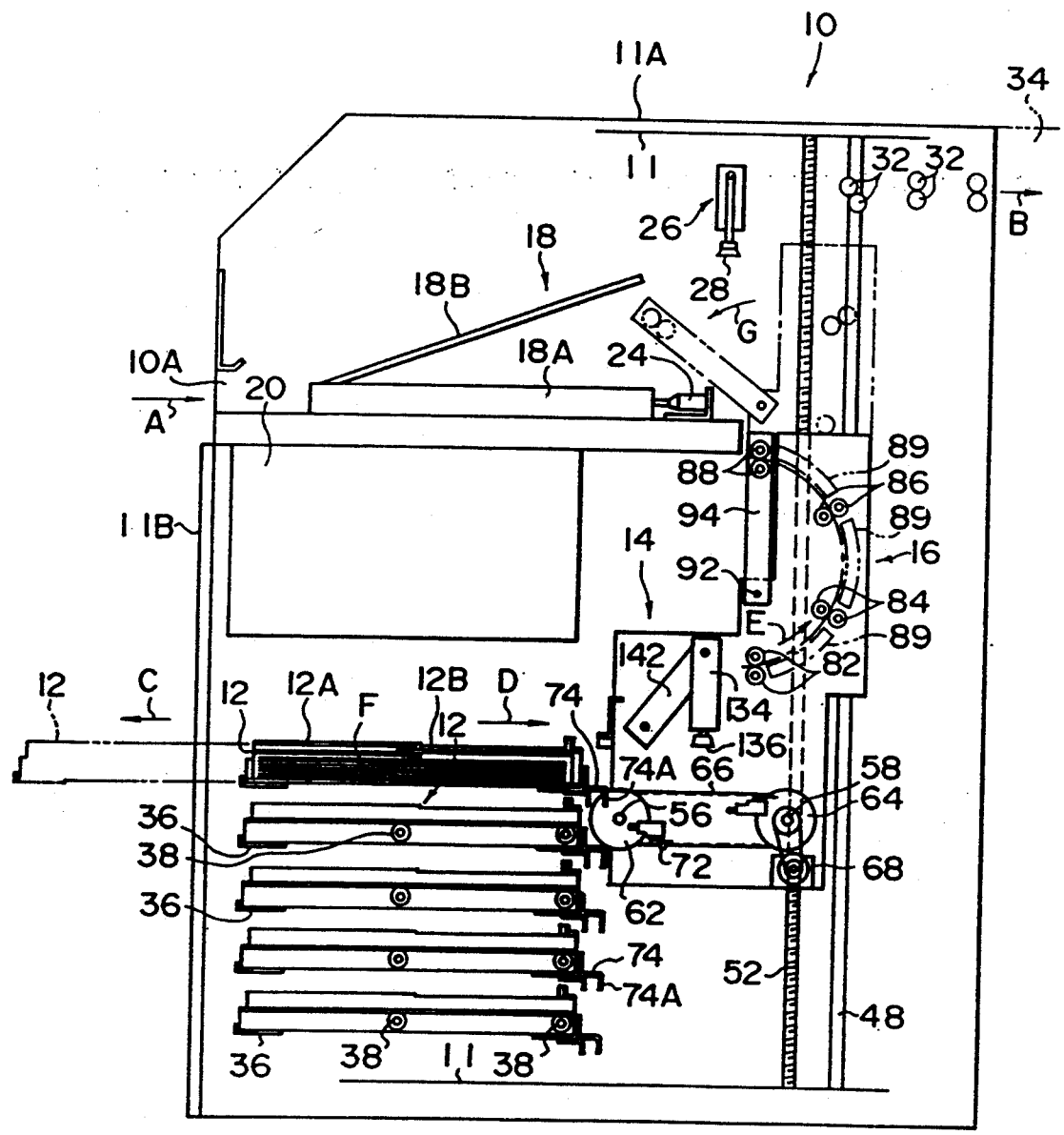
FIG. 13 is a modification in which a taking-out means and a holding means are forced integrally.

In the foregoing embodiments, an arrangement has been shown in which the sheet film F is held in the holding means 16 in a semicircularly curved configuration. However, it is not essential to make the entire area of the sheet film F into a curved configuration some portion of the sheet film F may be rectilinear. Furthermore, although in the foregoing embodiments an arrangement has been shown in which the taking-out means 14 and the holding means 16 are separately moved vertically, and these means may be moved vertically by being connected to each other as a unit, as shown in FIG. 13. FIG. 13 shows an arrangement in which the lifting frames 42, the taking-out means 14 and the lifting frames 122 of the holding means 16 are connected to each other. It suffices if the vertical guiding mechanism and the vertical driving mechanism are provided on either of the two means 14, 16. In FIG. 13, the vertical guiding mechanism and vertical driving mechanism of the taking-out means 14 are omitted.

Figure 14:
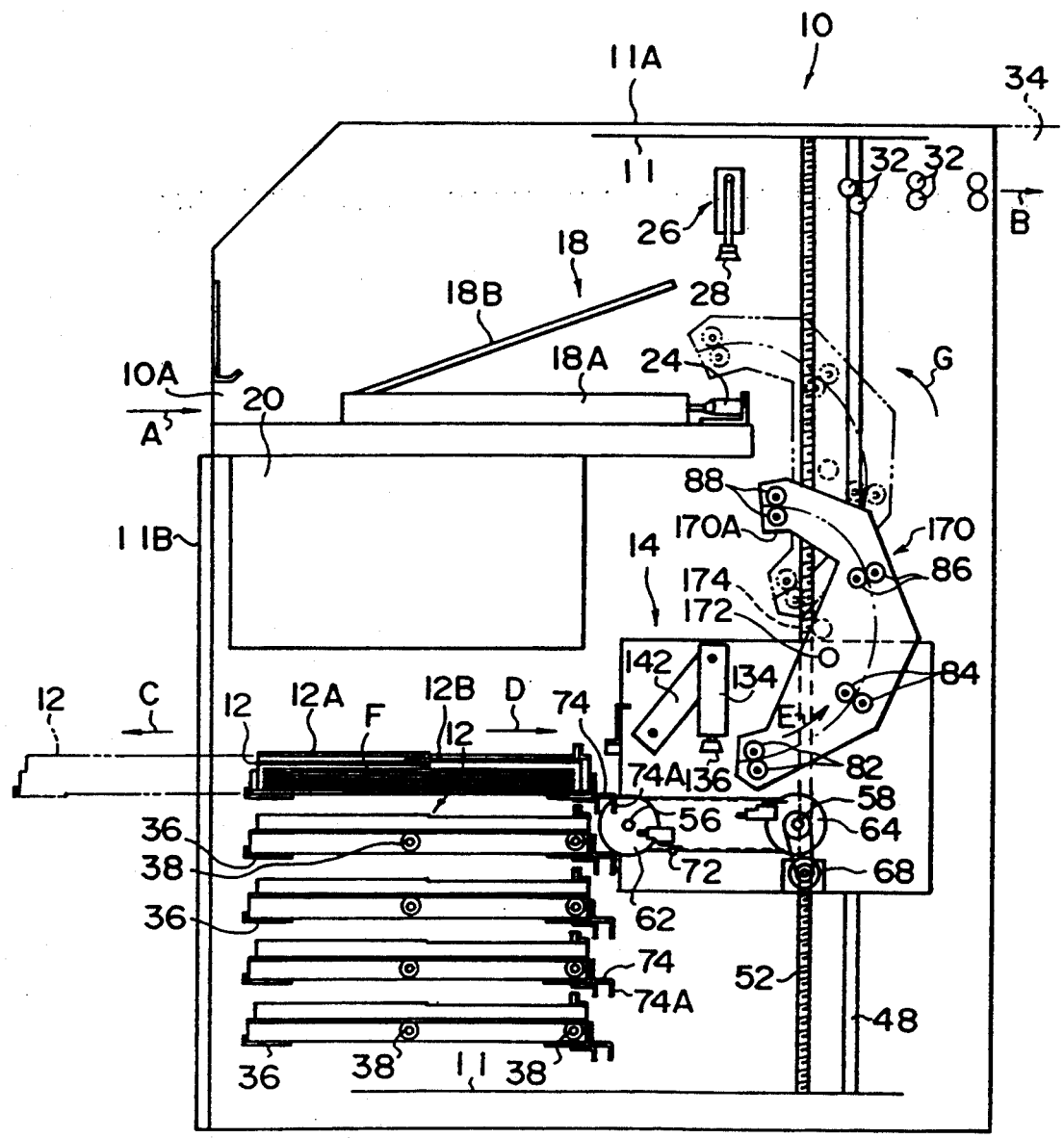
FIG. 14 is a modification in which a holding means is pivotally connected to a taking-out means.

The holding means may be pivotally connected to the taking-out means, as shown in FIG. 14. In this embodiment, the holding means 170 is pivotally connected to the taking-out means 14 by a pivot 172. The holding means 170 has a supplementary roller 174 for swinging the holding means in such a manner that the supplementary roller 174 engages with an unillustrated controlling member secured with the flame 11 when the holding means 170 and the taking-out means 14 reach a predetermined position. As shown in FIG. 14, the sheet film-supplying end portion 170A of the holding means 170 protrudes horizontally from the rest portion of the holding means 170, so as to locate close to the cassette 18 for supplying the sheet film to the cassette 18. In addition, it is preferred that the pair of rollers 88 in the sheet film-supplying end portion 170A is provided in such a manner that a plane including the pair of rollers 88 inclines toward the cassette 18 when the holding means 170 is moved to the position for supplying the sheet film to the cassette 18. Thus, the sheet film is fed downwardly from the holding means 170, and is accommodated properly in the cassette 18.

FIGS. 5 to 12 illustrate a third embodiment of the present invention. In this embodiment, the film-accommodating magazines 12 are respectively placed on trays 242 which serve as the movable carriages 36 mentioned in the foregoing embodiments. Various parts of the sheet film loading apparatus 10 other than these magazines 12 and trays 242 are identical with those of the first embodiment.

Figure 7:
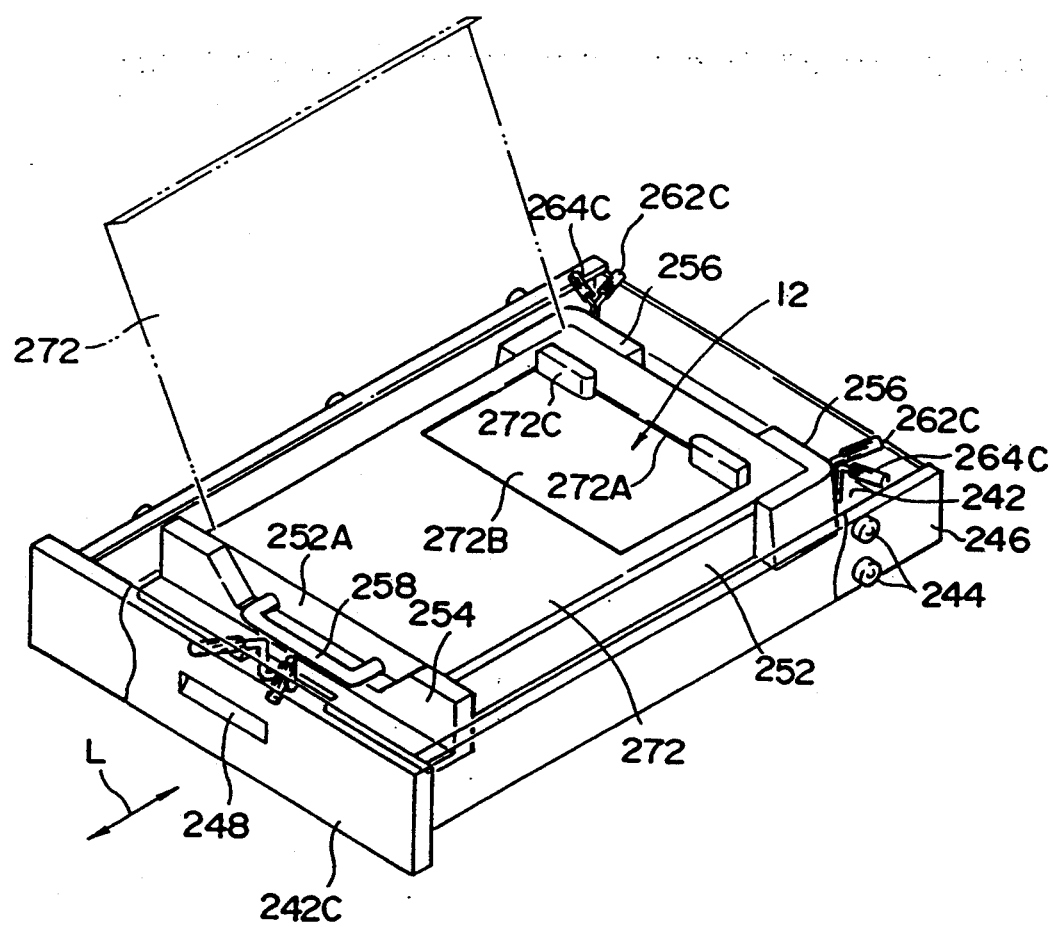
Figure 8:
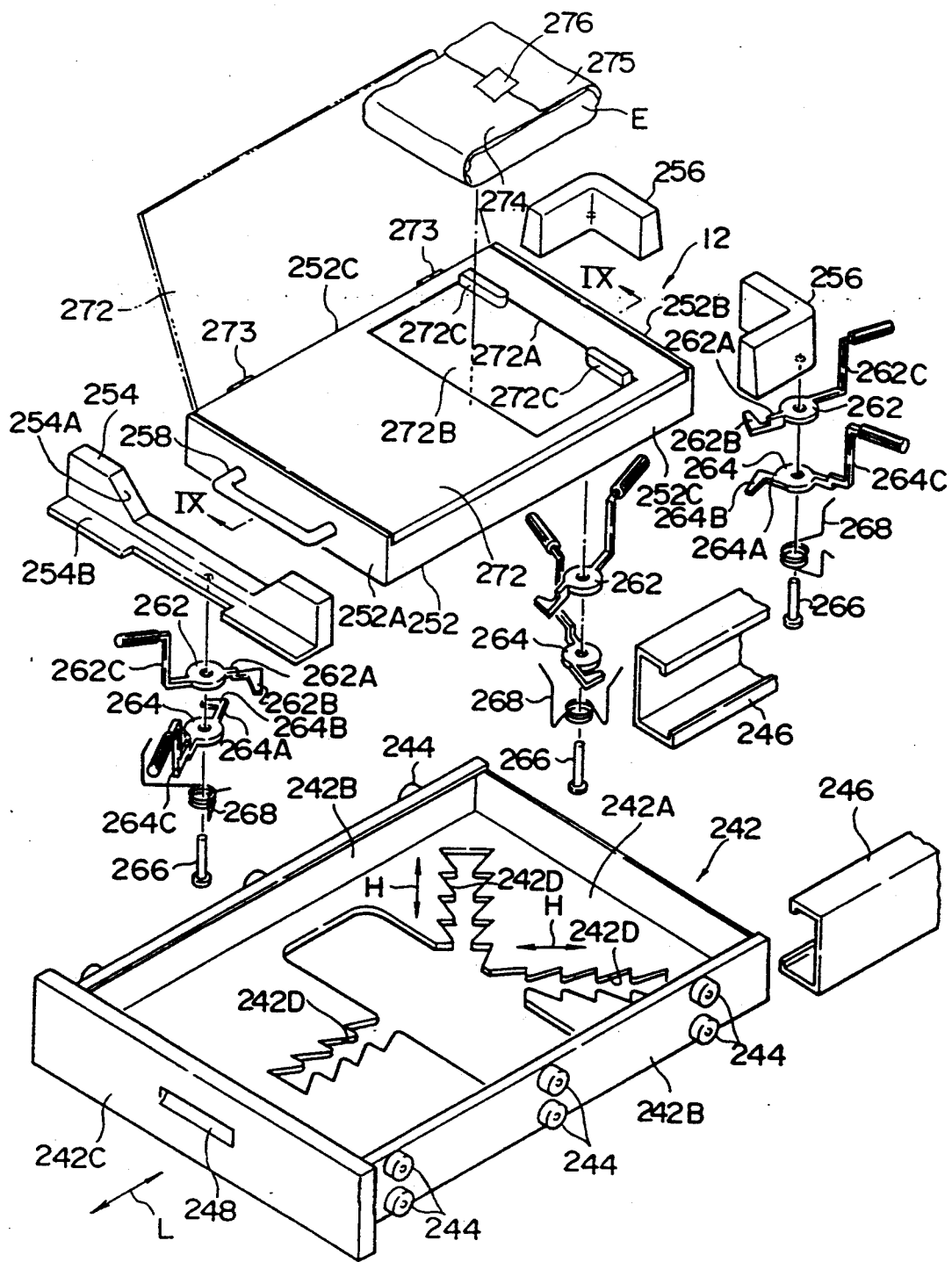
Figure 9:
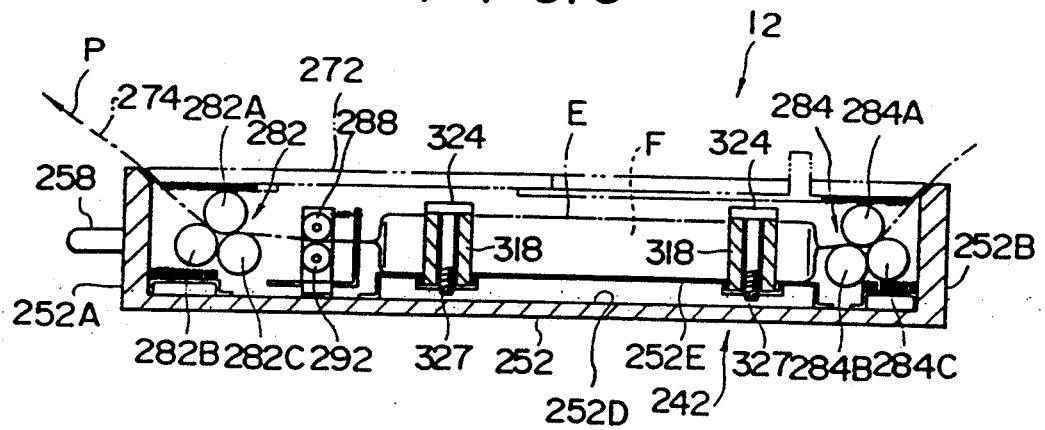

Referring now to FIGS. 7 to 9, a description will be given of the magazine 12.

As shown in FIG. 7, the magazine 12 is loaded into the sheet film loading apparatus 10 in a state in which the magazine 12 is placed on the tray 242 which serves as a movable carriage. As shown in FIG. 8, this tray 242 has a mounting plate 242A which serves as a portion for mounting the magazine 12 thereon. A plurality of support rollers 244, which have horizontal axes, are pivotally supported by side walls 242B erected on opposite sides of the mounting plate 242A. These support rollers 244 are guided by a pair of guide rails 246 having a U-shaped vertical section and fixed to the film loading apparatus 10 so as to render the tray 242 horizontally movable.

Figure 6:
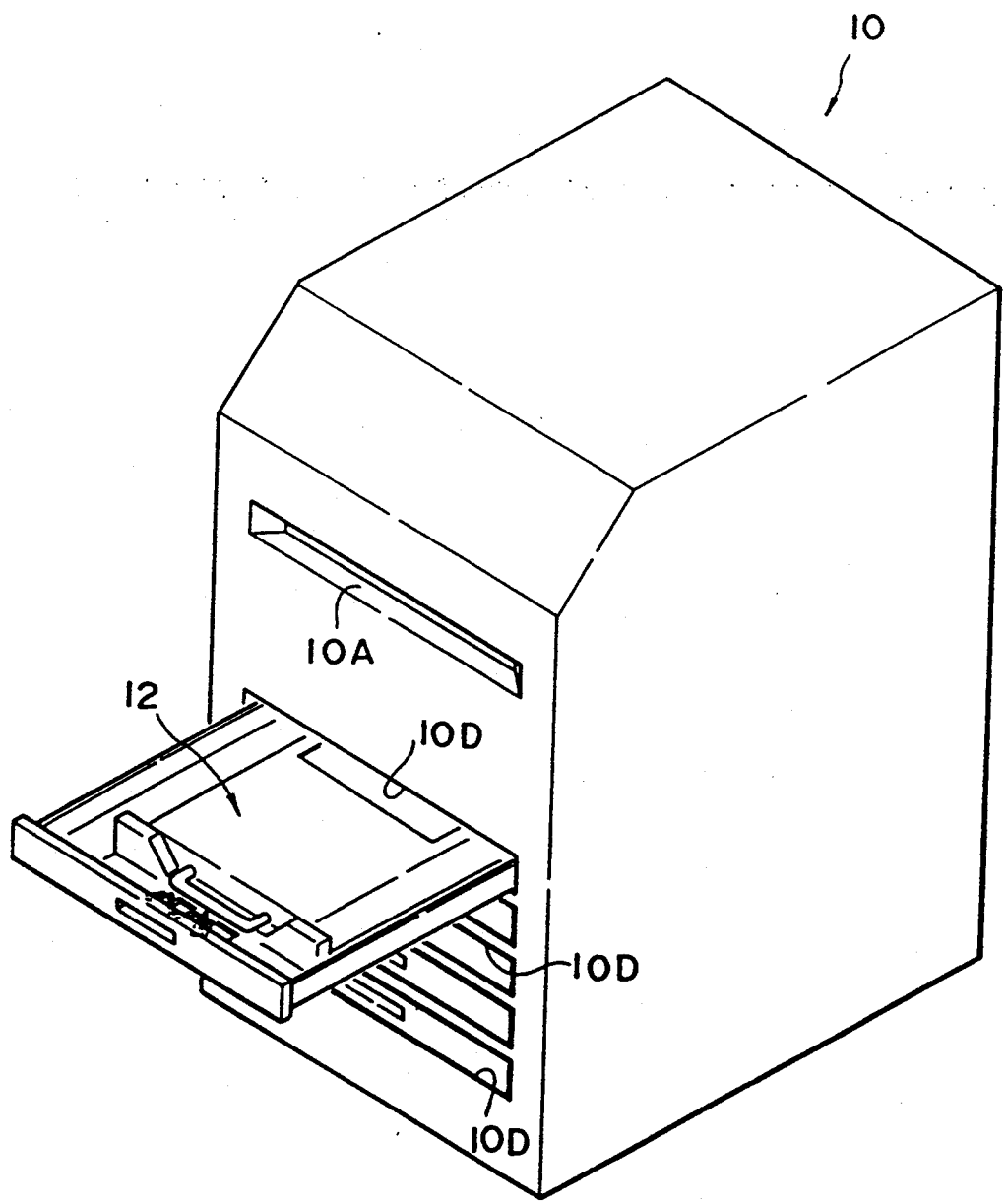

As a result, the tray 242 can be drawn out through a draw out opening 10D formed in a front surface of the film loading apparatus 10, as shown in FIG. 6, so that the magazine can thus be moved from the standby position to the film-replenishing position. Hence, the sheet films F can be replenished in the magazine 12 with the tray 242 set in a cantilevered state. A closure plate 242C is secured to a front side of the mounting plate 242A, and a gripping recessed portion 248 is formed in the closure plate 242C. This closure plate 242C serves to shield the interior of the film loading apparatus 10 from light by closing the drawing opening 10D with the magazine 12 inserted into the film loading apparatus 10.

It should be noted that the door 11B used in the foregoing embodiments is not provided.

The mounting plate 242A is provided with a fixing means for supporting at a fixed position end faces of the sheet films F located on the suction device 136 side so as to ensure that the sheet films F will be accommodated positively in the magazine 12 even if the sizes of the magazines 12 vary. That is, a magazine body 242 is formed into a rectangular box-shaped configuration, and is provided with a stopper 254 corresponding to its front plate 252A and a pair of L-shaped stoppers 256, as seen in a top plan view, that correspond to corner portions formed on a rear plate 252B and side plates 252C. The stopper 254 is provided with a notch 254A so as to prevent it interfering with a handle 258 secured to the front plate 252A of the magazine body 252. Furthermore, the stopper 254 has a horizontal plate 254B extending from a lower end thereof. A pair of rotating disks 262, 264 are coaxially and pivotally supported by this horizontal plate 254B by means of a pin 266. Arms 262A, 264A are respectively provided on the rotating disks 262, 264 in such a manner as to project horizontally therefrom. Distal end portions of these arms 262A, 264A constitute claws 262B, 264B which correspond to ratchet teeth 242D formed in the mounting plate 242A.

A torsion coil spring 268 is adapted to urge the claws 262B, 264B in mutually opposite directions to allow these claws 262B, 264B to engage the ratchet teeth 242D. . As a result, as each of the claws 262B, 264B engages with one of the ratchet teeth 242D, the positioning of the magazine body 252 in the lengthwise direction of the film (in the direction of arrow L in FIGS. 7 and 8) can be effected.

Operating arms 262C, 264C are respectively provided on the rotating disks 262, 264 in such a manner as to project therefrom. As a result, the operator is able to disengage the claws 262B, 264B from the ratchet teeth 242D by manually moving the operating arms 262C, 264C in a mutually approaching direction against the urging force of the torsion coil spring 268, thereby adjusting the position of the stopper 254 in the direction of arrow L.

In the same way as the stopper 254, each of the stoppers 256 is also provided with rotating disks 262, 264 and the like. The disks 262, 264 engage the ratchet teeth 242D formed in the mounting plate 242A in a diagonal direction in terms of its longitudinal direction. As a result, the stoppers 254, 256 are adapted to positively restrict the longitudinal and transverse movement of the magazine body 242 of a different size.

As shown in FIG. 8, an openable cover 272 is pivotally supported by the magazine body via a hinge 273. As this openable cover 272 is opened as shown by a two-dotted chain line in FIG. 8, a film package E can be accommodated in the magazine body 252. In the same way as the first embodiment, an opening 272A is formed in the openable cover 272 at a portion closer to the suction devices 136, and serves as a takeout port for the sheet films F. This opening 272A is closed by a slide cover 272B, and a pair of projections 272C of the slide cover 272B are adapted to open the opening 272A when they are brought into contact with an attracting piece (see the attracting piece 76 in FIG. 2) provided on the taking-out means 14 when the magazine moves from the standby position to the film taking-out position. This arrangement is similar to that of the first embodiment.

Figure 12:
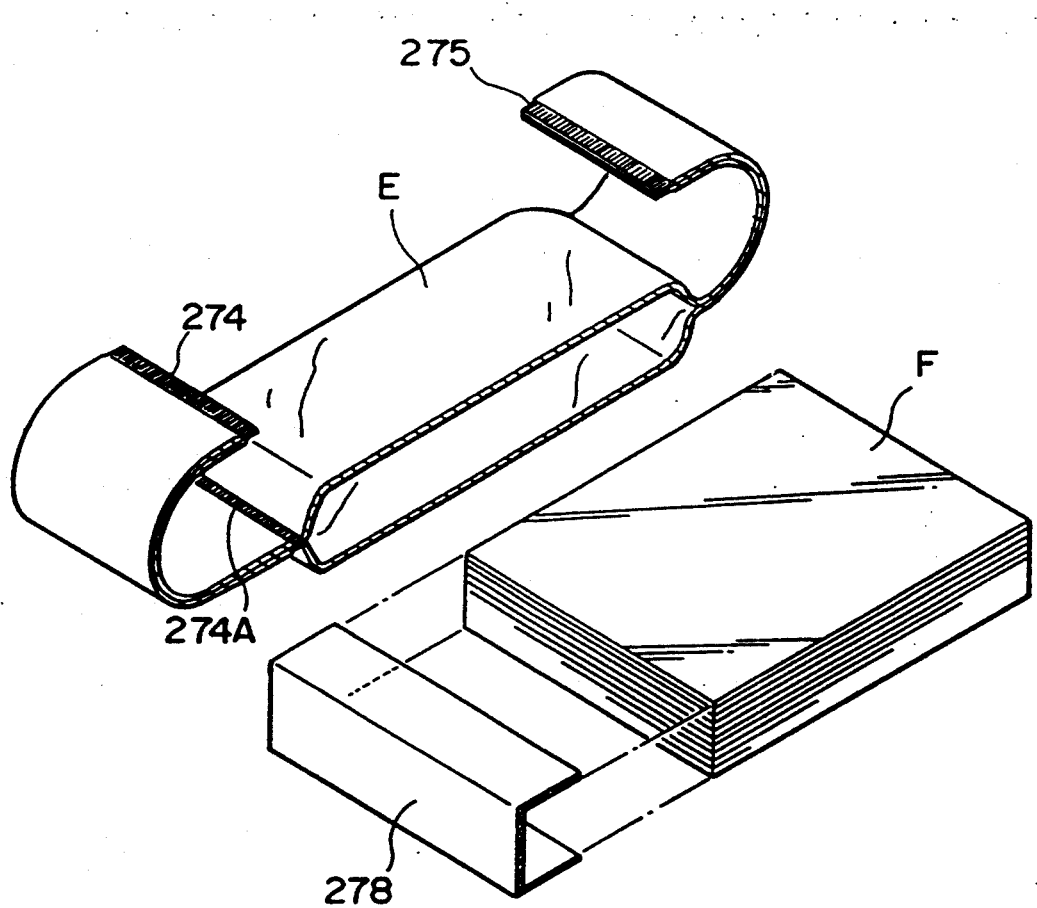

A plurality of sheet films F are accommodated in the film package E in a stacked state, as shown in FIG. 12. In addition, the state of the film package E prior to accommodating the sheet films F is tubular, and after the films are accommodated therein, opposite end portions and intermediate portions of this tubular package are hermetically sealed to form sealed portions 274, 275, 274A. As a result, the interior of the film package E is shielded from light, and the sealed portions 274, 275 are superposed on each other and are connected to each other via a seal tape 276, as shown in FIG. 8. A cardboard 278 having a U-shaped section and serving as a pad is accommodated in the film package E in such a manner as to surround the ends of the sheet films F that are remote from their opposite ends for being taken out by the suction devices 136 inside the film loading apparatus 10. This arrangement is designed to protect the edges of the sheet films F and facilitate the drawing out of the film package E.

This pad cardboard 278 may be provided with an identification mark such as a bar code or an embossed code indicating a film size, type, and the like. The identification mark may be read by a reading device provided in the film loading apparatus 10. In addition, this identification mark may be provided on not only the pad cardboard 278 but also the magazines 12 and the trays 242.

A description will now be given of the internal structure of the magazine body 252 with reference to FIGS. 9 and 10.

Two groups 282, 284 of light-shielding rollers are provided in the magazine body 252 in correspondence with the longitudinally opposite ends of the sheet films F accommodated therein. These groups 282, 284 of light-shielding rollers are respectively composed of three light-shielding rollers 282A, 282B, 282C and three light-shielding rollers 284A, 284B, 284C, and are pivotally supported by the side plates 252C in a state in which they partially abut each other. A pair of squeezing rollers 288, 292 are interposed between these groups of light-shielding rollers 282, 284 at a position closer to group 282.

Figure 11:
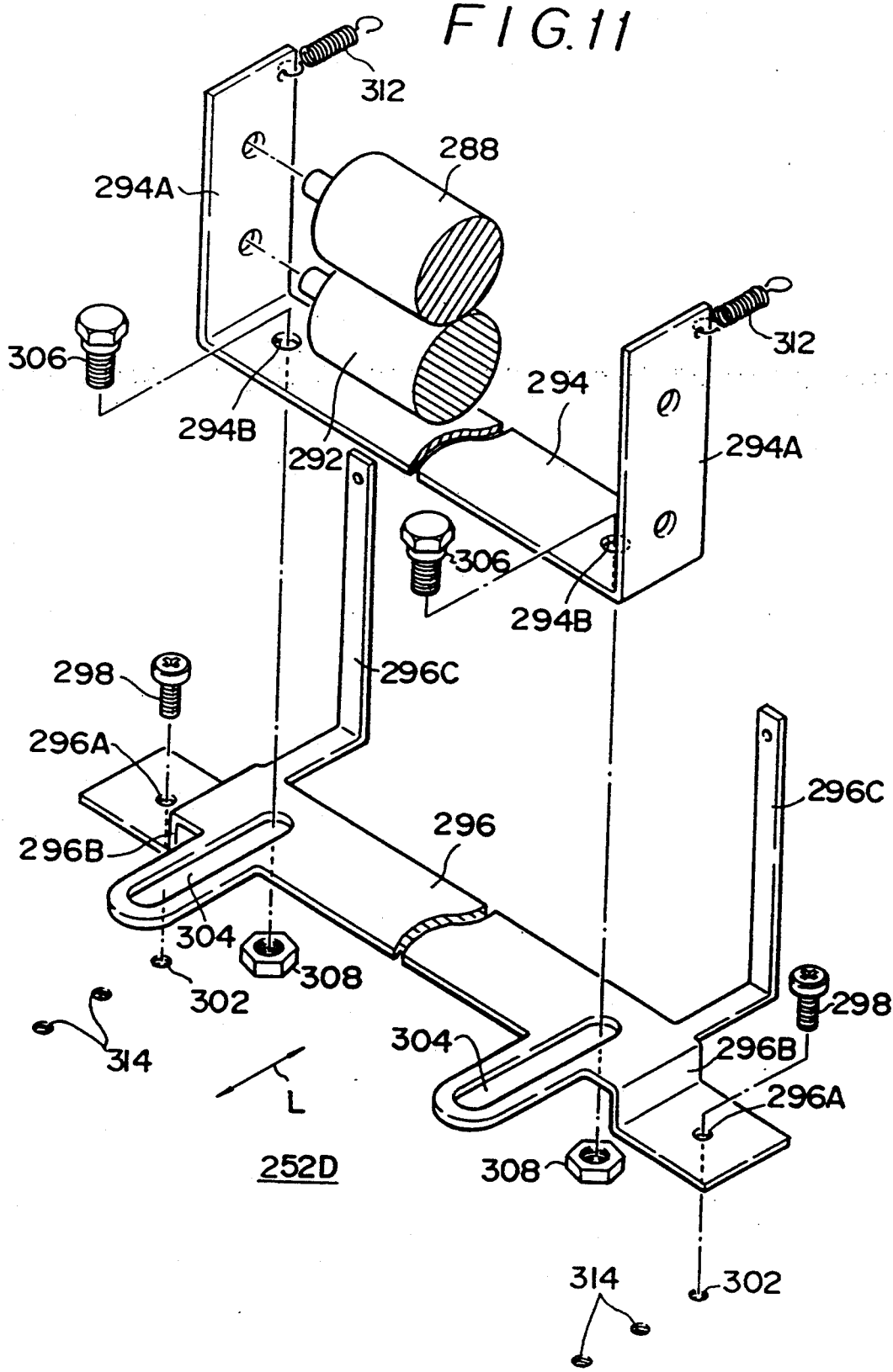

As also shown in FIG. 11, these squeezing rollers 288, 292 are pivotally supported by a pair of upright portions 294A respectively projecting from the opposite ends of a bracket 294. This bracket 294 is movable in the longitudinal direction of the sheet film F (in the direction of arrow L) by being guided by a mounting plate 296 secured to a bottom plate 252D of the magazine body 252. In other words, the longitudinal direction of the mounting plate 296 corresponds with the transverse direction of the sheet film F, and a pair of bolts 298 are respectively inserted through a pair of through holes 296A provided at opposite end portions of the mounting plate 296 so as to be secured to the bottom plate 252D. Tapped holes 302 for threadingly engaging with the mounting bolts 298 are provided in the bottom plate 252D.

A longitudinally intermediate portion of the mounting plate 290 is spaced apart from the bottom plate 252D by being bent at stepped portions 296B. A pair of elongated holes 304 extending in the longitudinal direction of the sheet film F are provided in the intermediate portion of the mounting plate 296. Stepped bolts 306 passing through through holes 294B provided in the bracket 294 are respectively inserted into these elongated holes 304. Nuts 308 are threadingly engaged to the tips of the stepped bolts 306. In addition, a pair of bent arms 296C are integrally provided on the mounting plate 296 in such a manner as to project from opposite ends thereof. A pair of tensile coil springs 312 are interposed between the arms 296C and the bracket 294.

In consequence, the squeezing rollers 288, 292 are made slidable as the stepped bolts 306 move inside the elongated holes 304 in the longitudinal direction of the sheet film F. The stepped bolts 306 remain abutting the ends of the elongated holes 304 on the side of the group of lightshielding rollers 284 and are thereby retained.

To alter the mounting positions of the bracket 294 and the mounting plate 296, the bottom plate 252D is provided with a plurality of reserve tapped holes 314 adjacent to the tapped holes 302, thereby making it possible to alter the mounting positions of the squeezing rollers 288, 292 in the longitudinal direction of the sheet film F.

Figure 10:
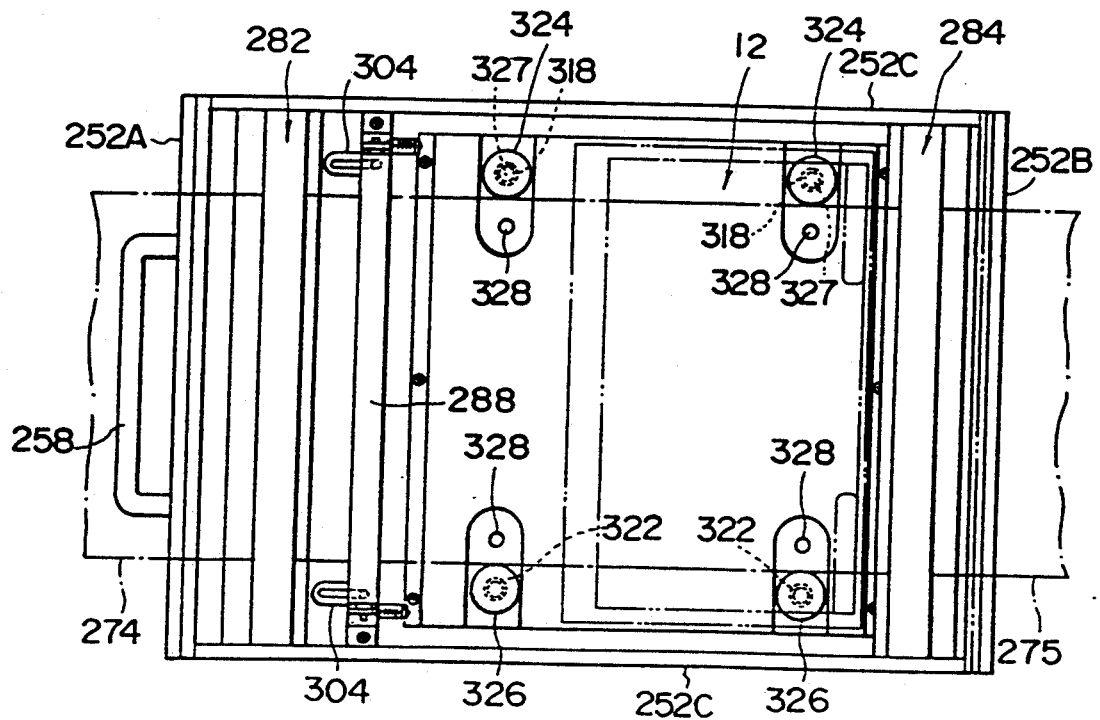

In addition, as shown in FIGS. 9 and 10, pivotally supported by a film mounting plate 252E placed on the bottom plate 252D are two pairs of guide rollers 318, 322 in correspondence with the transversely opposite ends of the sheet film F. These guide rollers 318, 322 are pivotally supported vertically on the bottom plate 252D as tip portions of mounting bolts 324, 326 which pass through their axes are threadingly engaged with tapped holes 327 provided in the film mounting plate 252E. In order to alter the mounting positions of the guide rollers 322, reserve tapped holes 328 are provided in the bottom plate 252D, thereby coping with a change in the width of the sheet films F. FIG. 10 illustrates only one set of reserve taped holes, but additional reserve tapped holes may be formed to cope with various changes in the film width.

The operation of this embodiment will be described hereinunder.

When the sheet films F are to be accommodated in the magazine body 252, the tray 242 is drawn out through the draw-out opening 10D of the film loading apparatus 10, as shown in FIG. 6. In this state, the tray 242 projects from the film loading apparatus 10 in a cantilevered manner. Since the magazine body 252 is mounted on the tray 242, the operator is readily able to accommodate the sheet films F in the magazine body 252.

In this accommodating operation, after the openable cover 272 of the magazine body 252 is opened as shown by the two-dotted chain line in FIGS. 7 and 8, the film package E with the sheet films F accommodated therein is accommodated in the magazine body 252. As for this film packet E, after cutting or removing the seal tape 276, its longitudinally opposite ends are passed between the groups of light-shielding rollers 282, 284, and the openable cover 272 is closed with the opposite ends projecting from the magazine body 252, as shown in FIG. 9. In this closed state, the groups of light-shielding rollers 282, 284 shield the interior of the magazine body 252 from light. It should be noted that, if, in the groups of light-shielding rollers, 282, 284, the light-shielding rollers 282B, 282C, and light-shielding rollers 284B, 284C are pivotally supported by the bottom plate 252D, and the light-shielding rollers 282A, 284A are pivotally supported by the openable cover 272, it is readily possible to set the film package E in the state shown in FIG. 9 by the operation of closing the openable cover 272 against the magazine body 252.

At this juncture, if the sealed portion 275 of the film package E is cut off, the end of the film package E projecting from the group of light-shielding rollers 284 becomes open. Then, the film package E is pulled in the direction of the sealed portion 274 (in the direction of arrow P) and is drawn out. As a result of this drawing-out operation, the film package E passes through the squeezing rollers 288, 292, and further through the group of light-shielding rollers 282, and are pulled outside the magazine body 252.

In this state, since the sheet films F and the pad cardboard 278 are unable to pass through the rollers 288, 292, so that the ends of the sheet films F are not clamped plate 252E. In addition, as shown in FIG. 10, the squeezing rollers 288, 292, together with the bracket 294, are movable in the direction of the group of light-shielding rollers 282 against the urging forces of the tension coil springs 312, but return to their original positions after the film package E has been drawn out.

As for the magazine body 252, the mounting positions of the squeezing rollers 288, 292 are altered in correspondence with the size of the sheet films F to be accommodated in the magazine body 252 (see FIG. 11). In other words, if the mounting bolts 298 that are used to fix the mounting plate 296 onto the bottom plate 252D, are removed from the tapped holes 302, and are threadingly engaged with the reserve tapped holes 314, it is possible to cope with sheet films F of a different size. One can then positively dispose the longitudinally one end of the sheet films F adjacent to the group 284 of light-shielding rollers in the state in which the film package E has been drawn out.

In addition, by making the mounting bolts 326 threadingly engage with the reverse tapped holes 328, it is possible to make the guide rollers 318, 322 correspond to the transversely opposite ends of the sheet films F with the film package E drawn out even in cases where width of the sheet films F is altered. In addition, since the guide rollers 318, 322 are rotatable about the mounting bolts 324, 326, the drawing resistance experienced at the time of drawing out the film package E can be reduced, and the moving resistance experienced at the time of taking out the sheet film F can be reduced.

In this operation of supplying the sheet films F, it is possible to perform the operation in the state in which the sheet films F are drawn out from the film loading apparatus 10, as shown in FIG. 6, without needing to remove the magazine from the film loading apparatus 10. Accordingly, the operation is easy even if the magazines 12 are heavy. In addition, it is also possible to draw out the tray 242 from the film loading apparatus 10, remove the magazine 12 from the tray 242, and accommodate the sheet films F in a separate plate, such as a dark room. In this case, it is possible to use films that are not inserted in the film package E.

Thus, after the film package E is removed from the magazine 12 and the sheet films F are accommodated in the magazine 12, the tray 242 is pushed into the film loading apparatus 10. Accordingly, closing plate 242 closes the drawing opening 10D and thereby shields the interior of the film loading apparatus 10 from light.

The operation of the taking-out means 14 and the holding means 16 in the film loading apparatus 10 is similar to that described in the first embodiment, and the sheet film F is similarly taken out from the magazine 12 and loaded into the cassette 18.

It should be noted that the structure for effecting a positioning for the stoppers 254, 256 in the above-described embodiment is not restricted to the rotating disks 262, 264. Various other structures can be adopted. In addition, although the stoppers 254, 256 are adapted to be movable so that magazines 12 of varying sizes can be mounted on any tray 242, an arrangement may be alternatively provided such that pins provided at different positions depending on the sizes of the magazines are selectively inserted into a multiplicity of accommodating holes provided in the tray, so that the film ends are always set at a fixed position on the tray irrespective of the magazine size. Furthermore, although two pairs of rollers are used as squeezing members in the above-described embodiment, an arrangement may be alternatively provided such that the film package E is passed through two pairs of guide plates device 34 (in the direction of arrow B). It should be noted that the following arrangement may be provided: When the cassette 18 is loaded into the sheet film loading apparatus 10, and the cover plate 18B is opened by the cover-opening pins 24, the cover plate 18B is opened further by an unillustrated cover opening/closing mechanism (e.g., a means disclosed in Japanese Utility Model Laid-Open Nos. 141950/1988 and 141951/1988). Subsequently, when a new sheet film F is loaded after the photographed sheet film F has been removed, the cover plate 18B is closed, and the cassette 18 is pushed out through the loading port 10A. As also shown in FIG. 2, the magazine 12 is formed in a configuration of a deep tray. A multiplicity of unexposed sheet films F are accommodated therein in a stacked state. An upper end surface of the magazine 12 constitutes a fixed cover plate 12A for closing its half portion which is opposite from the side close to the taking-out means 14, and its remaining half portion constitutes a takeout opening 12B. A slide cover 12C corresponds to the takeout opening 12B. The arrangement of the slide cover 12C is such that, as shown in FIG. 2, the slide cover 12C is movable from a position in which it positively closes the takeout opening 12B to a position in which it opens the takeout opening 12B after sliding and entering into a space below the cover plate 12A.

Magazines 12 are respectively accommodated, in a multiplicity of stages, on movable carriages 36 disposed within the frame 11 of the sheet film loading apparatus 10. Each of the movable carriages 36 is formed into a configuration of a frame for supporting peripheral bottom portions of the magazine 12, and each has a pair of bent portions 36A projecting horizontally from upper ends of both sides thereof. These bent portions 36A are placed on rollers 38 whose axes are pivotally supported by the frame 11 horizontally. The standby position of the movable carriage 36 is one in which it is set in the state shown by the solid line in FIG. 1 with the magazine 12 loaded thereon. The position of the movable carriage 36 for replenishing the sheet films F is one in which the movable carriage 36 is drawn out (in the direction of arrow C) after opening a door 11B of the frame 11 as viewed in FIG. 1. Fruthermore, the film taking-out position is when the magazine 12 has been moved in a rightward direction as viewed in FIG. 1 (in the direction of arrow D) from the standby position and the takeout opening 12B has reached below the taking-out means 14. In order to stop the magazine 12 in a predetermined position with the sheet films F in a standby state, the bent portions 36A are provided with notches 36B. The arrangement is such that when the notches 36B correspond to the rollers 38, the movement of the movable carriage 36 is stopped.

As shown in FIG. 2, the taking-out means 14 is provided with a pair of lifting frames 122 disposed parallel to each other. These lifting frames 122 are secured in parallel to each other by means of a plurality of connecting rods 124. A guide shaft 128 is passed through a pair of guide blocks 126 fixed to an outer side of each lifting frame 122. In addition, a pair of similar guide blocks 127 are also fixed to the outer side of one lifting frame 122 and are threadingly engaged with a screw shaft 132. These guide shafts 128 and the screw shaft 132 have vertical axes. The upper and lower ends of the guide shafts 128 are secured to the frame 11. The screw shaft 132 is pivotally supported by the frame 11 and is adapted to rotate by receiving a driving force from a motor 133. Accordingly, when the screw shaft 132 rotates upon receiving the driving force of the motor 133, the taking-out means 14 is capable of moving upward or downward so as to cope with each of the magazines 12.

Disposed between the lifting frames 122 are pair of suction devices 136 that are secured to a shaft 135 extending between arms 134. These arms 134 are pivotally supported by distal ends of a pair of arms 142 by means of a shaft 138. The arms 142 are respectively pivotally supported by the lifting frames 122 by means of a shaft 144. In addition, motors 146, 148 for controlling the angles of rotation of the arms 134, 142 are respectively provided on the arms 142 and the lifting frames 122. Their rotating forces are transmitted to the arms 134, 142 by means of endless belts 152, 154.

As a result, as the arms 134, 142 rotate, the suction devices 136 move substantially vertically downward from their positions shown in FIG. 1, suck the sheet film F accommodated in the magazine 12 which is in the film taking-up position and then raise and move in a rightward direction so as to send the tip portion of the sucked sheet film F to the holding means 16.

A pair of pulleys 62, 64 are respectively and pivotally supported at lower portions of the lifting frames 122 by means of support shafts 56, 58. An endless timing belt 66 is wound around and stretched between these pulleys 62, 64. The support shaft 58 is adapted to rotate by receiving a driving force from a motor 68 secured to the lifting frame 122. Pullout pin 72 is secured to a part of the endless timing belt 66, and its axis is parallel to the axes of the pulleys 62, 64 and corresponds to an engaging arm 74 secured to a front end of the movable carriage 36. This engaging arm 74 has a pullout pin-receiving portion 74A which is open downwardly in a U-shaped configuration. When the endless timing belt 66 rotates clockwise as viewed in FIG. 1, the pullout pin 72 is accommodated in the pullout pin-receiving portion 74A. As a result, the movable carriage 36, together with the magazine 12, is pulled out to below the taking-out means 14 in the direction of arrow D so as to assume the film taking-out position. The engaging arm 74 is provided with a notch 74B for avoiding interference with the endless timing belt 66.

The movable carriage 36 is pulled out to the film taking-out position as the pulleys 62, 64 rotate. During the course of the movement of the movable carriage 36 an arc 12D projecting upward from the slide cover 12C of the magazine 12 is brought into contact with a magnetic attracting piece 76 provided on the connecting rod 124 of the lifting frame 122, thereby hindering the movement of the slide cover 12C. As a result, the magazine and the slide cover 12C which move together with the movable carriage 36 move relative to each other, so that the takeout opening 12B is opened. In addition, when the movable carriage 36 and the magazine 12 are returned to the standby position by the reverse rotation of the pulleys 62, 64, since the attracting piece 76 prevents the movement of the slide cover 12C by means of its magnetic force, the slide cover 12C moves relative to the magazine 12, so that the takeout opening 12B is closed.

The holding means 16 comprises a pair of lifting frames 42 that are secured in parallel to each other by means of a plurality of connecting rods 44, as shown in FIG. 2. The sheet film F is held between these lifting frames 42.

A guide shaft 48, whose axis is vertical and whose upper and lower ends are secured to the frame 11, is passed through a pair of guide blocks 46 fixed to an outer side of each lifting frame 42. A screw shaft 52 is threadingly engaged with a pair of similar guide blocks 47, and this screw shaft 52 is disposed parallel with the guide shaft 48. For this reason, when the screw shaft 52 rotates by receiving a driving force of a motor 54, the lifting frame 42 moves vertically up to a predetermined position so as to correspond to each magazine 12 and cassette 18.

A pair of upper and lower entrance clamp rollers 82 are rotatably supported by and extend between lower portions of the lifting frames 42 in parallel with each other. These entrance clamp rollers 82 are adapted to receive the sheet film F taken out from the magazine by the suction devices 136 and feed the same in the direction of arrow E so as to hold the sheet film F in a semicircularly curved shape. Similar to the entrance clamp rollers 82, a pair of intermediate portion clamp rollers 84 and a pair of intermediate portion clamp rollers 86 are pivotally supported in correspondence with an intermediate portion of the sheet film F and thus held in the semispherical shape. Furthermore, a pair of exit clamp rollers 88 are provided to clamp a tip portion of the sheet film F held in the semicircular shape. For this reason, when a lengthy sheet film F is held, a rear-end portion of the sheet film F is clamped by the entrance clamp rollers 82, an intermediate portion thereof by the intermediate portion clamp rollers 84, 86, and the tip portion thereof by the exit clamp rollers 88. In addition, the arrangement is such that even in cases where the length of the sheet film F is short, the tip portion of the sheet film F can unfailingly be held by the exit clamp rollers 88.

These exit clamp rollers 88 are pivotally supported by tip portions of a pair of swingable frames 84 which in turn are pivotally supported by the lifting frames 42 by a shaft 92. A first swing link 97 is pivotally supported at a tip of each swingable frame 94 by means of a pin 96. The other end of the first swing link 97 is pivotally supported by a second swing link 99 by a pin 98. This second swing link 99 is pivotally supported by a rotating shaft 100 which is stretched between the lifting frames 42. A part of an endless belt 104 is wound around a pulley 102 that is secured to the rotating shaft 100. Another portion of the endless belt 104 is wound around a pulley 108 that is secured to an output shaft of a motor 106 which in turn is secured to the lifting frame 42.

Consequently, when the motor 106 rotates, the second swing link 99 rotates together with the rotating shaft 100, and the first swing link 97 receives this rotating force and swings the swingable frame 94 counterclockwise as viewed in FIG. 1 (in the direction of arrow G). As a result, the tip portion of the sheet film F moves to above the inlet/outlet portion of the cassette 18 with the tip portion clamped by the exit clamp rollers 88. This facilitates the insertion of the sheet film F into the cassette 18. As shown in FIG. 2, a plurality of pulleys 114 and endless timing belts 116 are disposed on the outer side of the lifting frame 42 so as to transmit a drive force from a motor 112 to the entrance clamp rollers 82, intermediate portion clamp rollers 84, 86, and exit clamp rollers 88. The operation of this embodiment will be described hereinunder. When the cassette 18 with a photographed sheet film F accommodated therein is loaded into the sheet film loading apparatus 10 through the loading port 10A in the direction of arrow A, the cassette driving mechanism 20 presses the cassette 18 against the cover-opening pins 24, so that the cover plate 18B is opened as shown in FIGS. 1 and 3. Subsequently, the suction device 28 of the taking-out means 26 sucks the sheet film F accommodated in the cassette body 18A and delivers the same to the conveying rollers 32. The photographed sheet film F is then sent to the developing device 34 so as to undergo development. Next, a film type discrimination signal (not shown) issued by an unillustrated a film discriminator attached to the cassette 18 is detected by an unillustrated detecting means, and a sheet film F to be loaded into the thus selected is accommodated. This movement is effected as the screw shaft 52 guiding the lifting frames 42 and the screw shaft 132 guiding the lifting frames 122 respectively rotate by receiving driving forces from motors 54, 133, which in turn causes the lifting frames 42, 122 to move vertically. When the taking out means 14 and the holding means 16 move to the side of this specific magazine 12, the motor rotates to cause the endless timing 66 to rotate clockwise as viewed in FIG. 1. As a result, the pullout pin is engaged with the engaging arm 74 and moves the movable carriage 36 from the standby position of the magazine 12 to its film taking-out position. In conjunction with the movement of the magazine 12, the arm 12D of the slide cover 12C is brought into contact with the attracting piece 76, so that the slide cover 12C is moved to below the cover plate A, thereby opening the takeout opening 12B. At this stage, as for the taking-out means, the motors 6, 148 rotate, and the suction devices 136 are pressed to an uppermost sheet film F accommodated in the magazine 12. Simultaneously, a negative pressure of an unillustrated negative pressure source is transmitted to the suction devices 136, with the result that a tip portion of the sheet film F is sucked. Subsequently, the suction devices 136 are raised with the rotation of the motors 146, 148 and are lifted up through the takeout opening 12B. The sheet film F is then inserted between the entrance clamp rollers 82. At this state, the motor 112 rotates and feeds the tip portion of the sheet film F in the direction of arrow E, and the supply of the negative pressure to the suction devices 136 is stopped. Consequently, the sheet film F passes consecutively between the entrance clamp rollers 82 and between the intermediate portion clamp rollers 84, 86. When the tip portion reaches the exit clamp rollers 88, the sheet film F is held by being curved in a semicircularly arcuate configuration with its tip clamped by the exit clamp rollers 88. In order to facilitate the smooth movement of the sheet film F between

What is claimed is:

1. A sheet film loading apparatus for selectively taking out a sheet film from a plurality of magazines and loading the sheet film into a cassette, comprising:
   means for taking out a sheet film from one of said magazines;
   means, connected to said taking-out means and adapted to receive, via a receiving end portion of said means, the sheet film supplied from said taking-out means, for holding the sheet film in a state in which at least part of the sheet film is curved, and for supplying the sheet film from a sheet film-supplying end portion of said holding means into said cassette, wherein said sheet film-supplying end portion of said holding means is movable to a position corresponding to said cassette; and
   means for integrally driving said taking-out means and said holding means from a first position where said taking-out means reaches a position corresponding to one of said magazines to a second position where said sheet film-supplying end portion of said holding means reaches the position corresponding to said cassette;
   wherein said holding means comprises a plurality of pairs of rollers, and
   wherein, of said plurality of pairs of rollers, a pair of rollers disposed in said sheet film-supplying end portion of said holding means is movable toward said cassette.

2. A sheet film loading apparatus according to claim 1, wherein said holding means includes means for holding the sheet film in a curved state, said holding means comprising said plurality of pairs of rollers.

3. A sheet film loading apparatus according to claim 2, wherein each end of said pairs of rollers are rotatably supported by a pair of frames, the sheet film is held between said pair of frames.

4. A sheet film loading apparatus according to claim 2, wherein said plurality of magazines are arranged in a vertical row, and the sheet film taken out from one of said magazines enters a lower portion of said holding means and is fed to said cassette from an upper portion of said holding means.

5. A sheet film loading apparatus according to claim 4, wherein said holding means comprises a supporting frame connected to said taking-out means and a swingable frame pivotally supported by the supporting frame, and wherein of said plurality of pairs of rollers, a pair of rollers disposed in said sheet film-supplying end portion is rotatably supported by the swingable flame, said pair of rollers being movable in the direction of said cassette by swinging of said swingable frame.

6. A sheet film loading apparatus according to claim 4, wherein the locus of movement of the sheet film inside said holding means is substantially semicircular, and the sheet film is supplied to said cassette after the front and back sides of the sheet film is inverted.

7. A sheet film loading apparatus according to claim 2, wherein said plurality of pairs of rollers are disposed at least in a film entrance portion, intermediate portion, and film-supplying end portion of said holding means.

8. A sheet film loading apparatus according to claim 2, wherein said holding means is pivotally connected to said taking-out means so as to be swingable between said first position for receiving the sheet film supplied from said taking-out means and said second position for supplying the sheet film to said cassette.

9. A sheet loading apparatus for selectively taking out a sheet film from a plurality of magazines and loading the sheet film into a cassette, comprising:
   means for taking out a sheet film from one of said magazines;
   means, connected to said taking-out means and adapted to receive, via a receiving end portion of said means, the sheet film supplied from said taking-out means, for holding the sheet film in a state in which at least part of the sheet film is curved, and for supplying the sheet film from a sheet film-supplying end portion of said holding means into said cassette, wherein said sheet film-supplying end portion of said holding means is movable to a position corresponding to said cassette; and
   means for integrally driving said taking-out means and said holding means from a first position where said taking-out means reaches a position corresponding to one of said magazines to a second position where said sheet film-supplying end portion of said holding means reaches the position corresponding to said cassette,
   said holding means including means for holding the sheet film in a curved state, said holding means comprising a plurality of pairs of rollers,
   wherein, of said plurality of pairs of rollers, a pair of rollers disposed in said sheet film-supplying end portion of said holding means is movable toward said cassette, and
   wherein, of said plurality of pairs of rollers, pars of rollers other than said pair of rollers disposed in said sheet film-supplying end portion receive driving forces via one-way clutches slipping in a direction in which the sheet film is conveyed.

10. A sheet film loading apparatus for selectively taking out a sheet film from a plurality of magazines and loading the sheet film into a cassette, comprising:
    means for taking out a sheet film from one of said magazines;
    means, connected to said taking-out means and adapted to receive, via a receiving end portion of said means, the sheet film supplied from said taking-out means, for holding the sheet film in a state in which at least part of the sheet film is curved, and for supplying the sheet film from a sheet film-supplying end portion said holding means into said cassette, wherein said sheet film-supplying end portion of said holding means is movable to a position corresponding to said cassette; and means for integrally driving said taking-out means and said holding means from a first position where said taking-out means reaches a position corresponding to one of said magazines to a second position where said sheet film-supplying end portion of said holding means reaches the position corresponding to said cassette;

said holding means including means for holding the sheet film in a curved state, said holding means comprising a plurality of pairs of rollers, wherein said holding means is pivotally connected to said taking-out means so as to be swingable between said first position for receiving the sheet film supplied from said taking-out means and said second position for supplying the sheet film to said cassette, and wherein said sheet film-supplying end portion of said holding means in which a pair of rollers of said plurality of pairs of rollers is provided, protrudes horizontally from the rest portion of said holding means, so as to enable said sheet film-supplying end portion of said holding means to be positioned adjacent to said cassette when said holding means is positioned in said second position.

11. A sheet film loading apparatus according to claim 10, wherein said pair of rollers in said sheet film-supplying end portion of said holding means is provided such that a plane including said pair of rollers is inclinable toward said cassette when said holding means is positioned in said second position, so that the sheet film is fed downwardly from said holding means.

* * * * *